(12) United States Patent
Roetker et al.

(10) Patent No.: US 8,016,968 B2
(45) Date of Patent: *Sep. 13, 2011

(54) PROCESS FOR PRODUCING AN IMAGING MEMBER BELT HAVING AN ANGULAR SEAM

(75) Inventors: Michael Stephen Roetker, Webster, NY (US); Donald Laflair, Rochester, NY (US); David Martin, Walworth, NY (US); Felix J. Santana, Webster, NY (US); John Joseph Darcy, III, Webster, NY (US); Scott Griffin, Webster, NY (US); Robert C. U. Yu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1215 days.

This patent is subject to a terminal disclaimer.

(21) Appl. No.: 11/193,904

(22) Filed: Jul. 29, 2005

(65) Prior Publication Data

US 2007/0023133 A1    Feb. 1, 2007

(51) Int. Cl.
  *B29C 53/36*    (2006.01)
(52) U.S. Cl. .................................. 156/217; 156/304.5
(58) Field of Classification Search ............... 156/304.1, 156/304.3, 304.5, 304.6, 502
  See application file for complete search history.

(56) References Cited

U.S. PATENT DOCUMENTS

| | | | |
|---|---|---|---|
| 524,726 A | 8/1894 | McHugh | |
| 3,121,006 A | 2/1964 | Middleton et al. | |
| 3,279,295 A * | 10/1966 | Teplitz | 83/601 |
| 3,357,989 A | 12/1967 | Byrne et al. | |
| 3,442,781 A | 5/1969 | Weinberger | |
| 4,022,095 A * | 5/1977 | Jones | 83/455 |
| 4,398,441 A | 8/1983 | Jue | |
| 4,401,002 A | 8/1983 | Worsham | |
| 4,415,639 A | 11/1983 | Horgan | |
| 4,567,802 A * | 2/1986 | Witherspoon | 83/581 |
| 4,589,208 A | 5/1986 | Iwasaki et al. | |
| 4,654,284 A | 3/1987 | Yu et al. | |
| 4,664,995 A | 5/1987 | Horgan et al. | |
| 4,758,486 A * | 7/1988 | Yamazaki et al. | 430/56 |
| 4,786,570 A | 11/1988 | Yu et al. | |
| 4,798,112 A | 1/1989 | Kozyrski et al. | |
| 4,937,117 A | 6/1990 | Yu | |
| 5,021,309 A | 6/1991 | Yu | |
| 5,190,608 A | 3/1993 | Darcy et al. | |
| 5,549,999 A | 8/1996 | Swain et al. | |
| 5,552,005 A | 9/1996 | Mammino et al. | |
| 5,582,949 A | 12/1996 | Bigelow et al. | |
| 5,647,261 A | 7/1997 | Wierenga | |

(Continued)

*Primary Examiner* — Mark A Osele
(74) *Attorney, Agent, or Firm* — Fay Sharpe LLP

(57) ABSTRACT

There is provided a process for producing a seamed, flexible electrostatographic imaging member belt comprising providing a flexible, substantially rectangular, electrostatographic imaging sheet having a first major exterior surface opposite and parallel to a second major exterior surface and a first marginal end region of said sheet opposite and parallel with a second marginal end region; shaping said first marginal end region at an angle to form a first new sloping surface between the first major exterior surface and the second major exterior surface, shaping said second marginal end region at an angle to form a second new sloping surface between the first major exterior surface and the second major exterior surface, wherein the second new sloping surface is substantially parallel with the first new sloping surface; forming the sheet into a loop and overlapping said first new sloping surface with said second new sloping surface to form a mated region; and, joining said first new sloping surface to said second new sloping surface in the mated region to form a thin profile butt-lap seam. The sloping surfaces may be formed using a cutting assembly in accordance with the disclosure.

18 Claims, 13 Drawing Sheets

U.S. PATENT DOCUMENTS

| | | |
|---|---|---|
| 5,688,355 A | 11/1997 | Yu |
| 5,698,358 A | 12/1997 | Yu |
| 6,042,917 A * | 3/2000 | Schlueter et al. ............... 428/60 |
| 6,074,504 A | 6/2000 | Yu et al. |
| 6,328,922 B1 | 12/2001 | Mishra et al. |
| 6,592,704 B1 * | 7/2003 | Benzing, II .................. 156/264 |
| 6,918,978 B2 * | 7/2005 | Yu ................................ 156/73.4 |
| 7,685,913 B2 * | 3/2010 | Roetker et al. .................. 83/694 |

* cited by examiner

PROCESS FOR PRODUCING AN IMAGING MEMBER BELT HAVING AN ANGULAR SEAM

CROSS REFERENCE TO RELATED APPLICATIONS

This application also relates to U.S. patent application Ser. No. 11/193,913, filed concurrently herewith, the disclosure of which is hereby incorporated by reference in its entirety.

BACKGROUND

Disclosed herein is a process for producing an imaging member belt having an angular seam design. This disclosure also provides a flexible imaging member belt having a number of morphological improvements and, more specifically, to the creation of a thin and smooth profile seam for flexible electrostatographic imaging member belts.

Flexible electrostatographic belt imaging members are well known. Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems. These belts are usually formed by cutting a rectangular, a square, or a parallelogram shape sheet from a web containing at least one layer of thermoplastic polymeric material, overlapping opposite ends of the sheet, and joining the overlapped ends together to form a seam. The seam typically extends from one edge of the belt to the opposite edge.

Generally, these belts comprise at least a supporting substrate layer and at least one imaging layer comprising thermoplastic polymeric matrix material. The "imaging layer" as employed herein is defined as the dielectric imaging layer of an electroreceptor belt, the transfer layer of an intermediate transfer belt and, the charge transport layer of an electrophotographic belt. Thus, the thermoplastic polymeric matrix material in the imaging layer is located in the upper portion of a cross section of an electrostatographic imaging member belt, the substrate layer being in the lower portion of the cross section of the electrostatographic imaging member belt. Although the flexible belts of interest include the mentioned types, for simplicity reasons, the discussion hereinafter will be focus on the electrophotographic imaging member belts.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A typical layered photoreceptor having separate charge generating (photogenerating) and charge transport layers is described in U.S. Pat. No. 4,265,990, the entire disclosure thereof being incorporated herein by reference. The charge generating layer is capable of photogenerating holes and injecting the photogenerated holes into the charge transport layer.

Although excellent toner images may be obtained with multilayered belt photoreceptors, it has been found that as more advanced, higher speed electrophotographic copiers, duplicators and printers have been developed, fatigue induced cracking of the charge transport layer at the welded seam area is frequently encountered during photoreceptor belt cycling. Moreover, the onset of seam cracking has also been found to rapidly lead to seam delamination due to fatigue thereby shortening belt service life.

The flexible electrostatographic imaging member belts are fabricated from a sheet cut from an imaging member web. The sheets are generally rectangular or parallelogram in shape. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. Ultrasonic welding is generally the preferred method of joining because it is rapid, clean (no solvents) and produces a thin and narrow seam. In addition, ultrasonic welding is preferred because the mechanical pounding of the welding horn causes generation of heat at the contiguous overlapping end marginal regions of the sheet to maximize melting of one or more layers therein. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

When ultrasonically welded into a belt, the seam of multilayered electrophotographic imaging flexible member belts may occasionally contain undesirable high protrusions such as peaks, ridges, spikes, and mounds. These seam protrusions present problems during image cycling of the belt machine because they interact with cleaning blades to cause blade wear and tear which ultimately affect cleaning blade efficiency and service life. Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member.

Another frequently observed mechanical failure in the imaging belts during image cycling is that the ultrasonically welded seam of an electrophotographic imaging member belt can also cause initiation of cracks in the seam which then propagate and lead to delamination after being subjected to extended bending and flexing cycles over small diameter belt support rollers of an imaging machine or when due to lateral forces caused by mechanical rubbing contact against stationary web edge guides of a belt support module during cycling. Seam cracking and delamination has also been found to be further aggravated when the belt is employed in electrophotographic imaging systems utilizing blade cleaning devices and some operational imaging subsystems. Alteration of materials in the various photoreceptor belt layers such as the conductive layer, hole blocking layer, adhesive layer, charge generating layer, and/or charge transport layer to suppress cracking and delamination problems is not easily accomplished. The alteration of the materials may adversely impact the overall physical, electrical, mechanical, and other properties of the belt such as well as coating layer uniformity, residual voltage, background, dark decay, flexibility, and the like.

For example, when a flexible imaging member belt used in an electrophotographic machine is a photoreceptor belt fabricated by ultrasonic welding of overlapped opposite ends of a sheet, the ultrasonic energy transmitted to the overlapped ends melts the thermoplastic sheet components in the overlap region to form a seam. The ultrasonic welded seam of a multilayered photoreceptor belt is relatively brittle and low in strength and toughness. The joining techniques, particularly the welding process, can result in the formation of a splashing that projects out from either side of the seam in the overlap region of the belt. The overlap region and splashings on each side of the overlap region comprise a strip from one edge of the belt to the other that is referred herein as the "seam region". The seam region of a typical overlap seamed flexible belt is about 1.6 times thicker than the thickness of the body of the belt. Because of the splashing, a typical flexible imaging member seamed belt has sharp top splashing height of about 76 micrometers above the surface of the imaging layer at the junction meeting point between the top splashing and the surface of the belt. The junction meeting point is the undesirable site of physical discontinuity which has been found to act as stress concentration point to facilitate early onset of seam cracking/delamination problems under dynamic fatigue imaging member belt machine functioning conditions.

The photoreceptor belt in an electrophotographic imaging apparatus undergoes bending strain as the belt is cycled over a plurality of support and drive rollers. The excessive thickness of the photoreceptor belt in the seam region due to the presence of the splashing results in a large induced bending strain as the seam travels over each roller. Generally, small diameter support rollers are highly desirable for simple, reliable copy paper stripping systems in electrophotographic imaging apparatus utilizing a photoreceptor belt system operating in a very confined space. Unfortunately, small diameter rollers, e.g., less than about 0.75 inch (19 millimeters) in diameter, raise the threshold of mechanical performance criteria to such a high level that photoreceptor belt seam failure can become unacceptable for multilayered belt photoreceptors. For example, when bending over a 19 millimeter diameter roller, a typical photoreceptor belt seam splashing may develop a 0.96 percent tensile strain due to bending. This is 1.63 times greater than a 0.59 percent induced bending strain that develops within the rest of the photoreceptor belt. Therefore, the 0.96 percent tensile strain in the seam splashing region of the belt represents a 63 percent increase in stress placed upon the seam splashing region of the belt.

Under dynamic fatiguing conditions, the seam provides a focal point for stress concentration and becomes the point of crack initiation which is further developed into seam delamination causing premature mechanical failure in the belt. Thus, the splashing tends to shorten the mechanical life of the seam and service life of the flexible member belts used in copiers, duplicators, and printers. Moreover, the known seam splashing surface roughness has also been found to interfere with cleaning blade function resulting in premature blade wear problem causing its loss of cleaning efficiency.

Although a solution to suppress the seam cracking/delamination problems has been successfully demonstrated, as described in a prior art, by a specific heat treatment process of a flexible electrophotographic imaging member belt with its seam parked directly on top of a 19 mm diameter back support rod for stress-releasing treatment at a temperature slightly above the glass transition temperature (Tg) of the charge transport layer of the imaging member, nevertheless this seam stress release process was also found to produce various undesirable effects such as causing seam area imaging member set and development of belt ripples in the active electrophotographic imaging zones of the belt (e.g., the region beyond about 25.2 millimeters from either side from the midpoint of the seam). Moreover, the heat treatment can induce undesirable circumferential shrinkage of the imaging belt. The set in the seam area of an imaging member mechanically adversely interacts with the cleaning blade and impacts cleaning efficiency. The ripples in the imaging member belt manifest themselves as copy printout defects. Further, the heat induced imaging belt dimensional shrinkage alters the precise dimensional specifications required for the belt. Another key shortcoming associated with the prior art seam stress release heat treatment process is the extensive heat exposure of a large seam area. This extensive heat exposure heats both the seam area of the belt as well as the rod supporting the seam. Since the belt must be cooled to below the glass transition temperature of the thermoplastic material in the belt prior to removal from the support rod in order to produce the desired degree of seam stress release in each belt, the heat treatment and cooling cycle time is unduly long and leads to very high belt production costs. Furthermore, it has been found that seam cracking life extension can be achieved through seam stress processing, nevertheless the surface roughness produced by seam splashing still produces difficulties with respect to the cleaning blade function.

Since there is no effective way to prevent the generation of localized high protrusion spots at the seam region, imaging member belts are inspected right after seam welding belt production process, manually by hand wearing a cotton glove through passing the index finger over the entire seam length. Belts found catching the glove by the protrusion spots are identified as production rejects. Both the time consuming procedure of manual inspection and the number of seamed belts rejected due to the presence of high seam protrusion spots constitute a substantial financial burden on the production cost of imaging member belts.

Therefore, there is a need to provide seamed flexible imaging belts with an improved seam morphology which can withstand greater dynamic fatigue conditions thereby extending belt service life. It is also important, from a production point of view, to reduce the unit manufacturing cost of seamed imaging belts. This can be realized, in part, if a seam design can be developed to provide a smooth surface free of protrusion spots, reduce seam thickness, with little or no splashing to eliminate or minimize physical discontinuity at the junction or mating point of the seam.

The following references may be relevant to certain aspects of this disclosure:

U.S. Pat. No. 5,688,355 to Yu, issued Nov. 18, 1997—A seamed flexible belt and process for fabricating the belt is disclosed. Multiple-layered electrophotographic imaging member belt is prepared by utilizing excimer laser ablation technique to remove precision amount of material from the bottom and the top of two opposite ends of an imaging member cut sheet prior to overlapping the two opposite ends and ultrasonically weld the overlap into a welded seam. The resulting multi-layered imaging member belt thus obtained has a welded seam of little added thickness and reduced amount of seam splashing formulation.

U.S. Pat. No. 5,698,358 to Yu, issued Dec. 16, 1997—Disclosed is a process including providing a flexible substantially rectangular sheet having a first major exterior surface opposite and parallel to a second major exterior surface, removing or displacing material from the first exterior surface adjacent and parallel to a first edge of the sheet to form a new surface having an elongated, curvilinear "S" shaped profile when viewed in a direction parallel to the first edge, overlapping the new first surface and a second surface adjacent a second edge of the sheet whereby the first new surface contacts the second surface to form a mated surface region, the second surface being adjacent to or part of the second major exterior surface to form a sheet into a loop, the second edge being at an end of the sheet opposite from the first edge, and permanently joining the new first surface to the second surface into a seam to form a seamed belt. The resulting welded belt has a seam thickness of less than about 120 percent of the total thickness of the belt.

U.S. Pat. No. 5,190,608 to Darcy et al., issued Mar. 2, 1993—A flexible belt is disclosed having an outwardly facing surface, a welded seam having irregular protrusion on the outwardly facing surface and a thin flexible strip laminated and covering the welded seam and protrusions. This belt may be fabricated by providing a flexible belt having an outwardly facing surface and a welded seam having irregular protrusions on the outwardly facing surface and laminating a thin flexible strip to the welded seam. The belt may be used in an electrostatographic imaging process.

U.S. Pat. No. 5,549,999 to Swain et al., issued Aug. 27, 1996—Disclosed is a process for coating flexible belt seams including providing a flexible belt having an outwardly facing surface and a welded seam, forming a smooth liquid coating comprising a hardenable film forming polymer on the welded seam, the coating being substantially free of fugitive solvent, and hardening the coating to form a smooth solid coating on the seam.

U.S. Pat. No. 5,582,949 to Bigelow et al., issued Dec. 10, 1996—A process for coating flexible belt seams is disclosed wherein the process includes providing a flexible belt having an outwardly facing surface and a welded seam, forming a smooth liquid coating on the welded seam, the liquid coating comprising a film forming polymer and a fugitive liquid carrier in which the belt surface is substantially insoluble, and removing the fugitive liquid carrier to form a smooth solid coating on the seam.

U.S. Pat. No. 6,328,922 B1 to Mishra et al., issued Dec. 11, 2001—A process for the post treatment of an imaging member belt including providing a support member having a smooth flat surface, proving a flexible belt having a welded seam, supporting the inner surface of the seam on the smooth flat surface, contacting the seam with a heated surface, heating the seam region with the heated surface to raise the temperature in the seam region to a temperature of from about 2° C. to 20° C. about the Tg of the thermoplastic polymer material, and compressing the seam with the heated surface with sufficient compression pressure to smooth out the seam is disclosed herein.

U.S. Pat. No. 5,552,005 to Mammino et al., issued Sep. 3, 1996—A flexible imaging sheet and a method of constructing a flexible imaging sheet is disclosed. The method of constructing a flexible imaging sheet comprises the steps of overlapping, joining, and shaping. In the step of overlapping, a first marginal end region and a second marginal end region of a sheet are overlapped to form an overlap region and a non-overlap region. In the step of joining, the first marginal end region and the second marginal end region of the sheet are joined to one another by a seam in the overlap region. In the step of shaping, the overlap region is shaped to form a generally planar surface co-planar with a surface of the non-overlap region. The flexible imaging sheet comprises a first marginal end region and a second marginal end region. The first marginal end region and the second marginal end region are secured by a seam to one another in the overlap region. The first marginal end region and the second marginal end region are substantially co-planar to minimize stress on the flexible imaging sheet. Minimization of stress concentration, resulting from dynamic bending of the flexible imaging sheet during cycling over a roller within an electrophotographic imaging apparatus, is disclosed therein.

U.S. Pat. No. 6,074,504 to Yu et al., issued Jun. 13, 2000—a process is disclosed for treating a seamed flexible electrostatographic imaging belt including providing an imaging belt having two parallel edges, the belt comprising at least one layer comprising a thermoplastic polymer matrix and a seam extending from one edge of the belt to the other, the seam having an imaginary centerline, providing an elongated support member having at arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member, precisely traversing the length of the seam from one edge of the belt to the other with thermal energy radiation having a narrow Gaussian wavelength distribution of between about 10.4 micrometers and about 11.2 micrometers emitted from a carbon dioxide laser, the thermal energy radiation forming a spot straddling the seam during traverse, the spot having a width of between about 3 millimeters and about 25 millimeters measured in a direction perpendicular to the imaginary centerline of the seam, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member.

While various innovative approaches have provided improvements in flexible belt seam morphology, nevertheless, it has been found that the solution of one problem may also create other undesirable issues. For example, overcoating the seam of a photoreceptor belt with metallic foil could cause electrical seam arcing. Moreover, application of liquid overcoating layer over the seam also induces the crystallization of charge transport molecules in the vicinity adjacent to the seam overcoat. Additionally, it was also observed that application of the liquid overcoating layer usually produced poor adhesion bond strength to the seam after solidification into a dried coat. Thus, there is a continuing need for electrostatographic imaging belts having improved welded seam designs that are thin in seam profile, resistant to seam cracking/delamination, free of seam protrusions, have improved seam region physical continuity, and are free of factors that damage imaging subsystems.

BRIEF DESCRIPTION

The present disclosure provides, in various embodiments thereof, an electrostatographic imaging member belt that has an improved morphology that overcomes one or more of the above-noted deficiencies. A process and apparatus for providing such an imaging member is also disclosed herein.

The present disclosure also provides in various embodiments thereof, a process and assembly for providing morphologically improved seam for an electrostatographic imaging member belt.

Further, the present disclosure provides, in various embodiments thereof, an electrostatographic imaging member belt having an improved welded seam that exhibits greater resistance to the onset of dynamic fatigue induced seam cracking and/or delamination.

The development disclosed herein provides, in various embodiments thereof, an electrostatographic imaging member belt having an improved welded seam that provides good circumferential dimension tolerance and robust mechanical seam function as well.

The disclosure also provides, in various embodiments thereof, an electrostatographic imaging member belt having an ultrasonically welded seam that reduces cleaning blade wear.

Additionally, the development disclosed herein provides, in various embodiments thereof, a seamed electrostatographic imaging member belt having an improved welded seam that is substantially free of seam protrusions, has little or no splashing, and has a smooth surface morphological profile. A process for manufacturing such an imaging member is further disclosed herein.

Furthermore, the present disclosure provides, in various embodiments thereof, a method to fabricate an electrostatographic imaging member belt having an improved welded seam that has little or no seam region physical discontinuity.

The development also provides, in various embodiments thereof, a seamed electrostatographic imaging member belt with a reduced seam area thickness to minimize the seam region induced bending stress when the electrostatographic imaging member belt flexes over small diameter belt module support rollers.

The foregoing aspects and others may be accomplished in accordance with this disclosure by providing, in various embodiments thereof, a process for producing a seamed, flexible electrostatographic imaging member belt by providing a flexible, substantially rectangular, electrostatographic imaging sheet having a first major exterior surface opposite and parallel to a second major exterior surface and a first marginal end region of said sheet opposite and parallel with a second marginal end region; providing an apparatus for cutting the imaging sheet, the apparatus comprising a support member, a blade support member connected to the support member, and a blade assembly connected to the blade support members, the blade assembly having a cutting blade; shaping said first marginal end region at an angle to form a first new sloping surface between the first major exterior surface and the second major exterior surface; shaping said second marginal end region at an angle to form a second new sloping surface between the first major exterior surface and the second major exterior surface, wherein the second new sloping surface is substantially parallel with the first new sloping surface; forming the sheet into a loop and overlapping said first new sloping surface with said second new sloping surface to form a mated region; and, joining said first new sloping surface to said second new sloping surface in the mated region to form a seam. Although the bonding of the mated sloping surfaces of the imaging member end pair into a seamed belt can be accomplished by gluing, stapling, solvent welding, ultrasonic welding process, and the like, nonetheless ultrasonic seam welding is the process of particular preference based on the ease of operation, seam bonding strength, and economic considerations. Also disclosed herein is the seamed, flexible electrostatographic imaging member belt produced by this process.

The disclosure also provides, in various embodiments thereof, a process for producing a seamed, flexible electrostatographic imaging member belt comprising a) providing a flexible, substantially rectangular, electrostatographic imaging sheet having a first major exterior surface opposite and parallel to a second major exterior surface and a first marginal end region of said sheet opposite and parallel with a second marginal end region; b) providing an apparatus for cutting the imaging sheet, the apparatus comprising i) a support member, ii) a blade support member connected to the support member, and iii) a blade assembly connected to the blade support member, the blade assembly having a cutting blade; c) shaping said first marginal end region at an angle to form a first new sloping surface between the first major exterior surface and the second major exterior surface; d) shaping said second marginal end region at an angle to form a second new sloping surface between the first major exterior surface and the second major exterior surface, wherein the second new sloping surface is substantially parallel with the first new sloping surface; e) forming the sheet into a loop and overlapping said first new sloping surface with said second new sloping surface to form a mated region; and f) joining said first new sloping surface to said second new sloping surface in the mated region to form a seam, wherein the first and second sloping surfaces have an angle substantially equal to each other, the angle of the first and second sloping surfaces being less than 90°.

Further, the disclosure provides, in various embodiments thereof, A method for producing a seamed, flexible electrostatographic imaging member belt comprising providing a flexible, substantially rectangular, electrostatographic imaging sheet having a top surface, a bottom surface, a first major exterior surface opposite and parallel to a second major exterior surface and a first marginal end region of said sheet opposite and parallel with a second marginal end region; providing a cutting apparatus comprising i) a support member having an upper surface, a lower surface, a first vertical surface, a second vertical surface, a proximate end, and a distal end, ii) a blade support member pivotably connected to the support member, the blade support member comprising a pivot arm having a proximate end, a distal end, an upper portion adjacent the proximal end, and a lower portion adjacent the proximate end of the blade support member; and iii) a blade mount assembly connected to the blade support member, the blade mount assembly comprising a cutting blade having a blade edge wherein the cutting blade is oriented at an angle of about 45° or less relative to the top and bottom surfaces of the imaging sheet; shaping said first marginal end region at an angle to form a first new angled surface between the first major exterior surface and the second major exterior surface; shaping said second marginal end region at an angle to form a second new angled surface between the first major exterior surface and the second major exterior surface, wherein the second new angled surface is substantially parallel with the first new angled surface; forming the sheet into a loop and overlapping said first new angled surface with said second new angled surface to form a mated region; and joining said first new angled surface to said second new angled surface in the mated region to form a seam.

Another embodiment disclosed herein is a flexible imaging member belt having an angled, or angular, cross-sectional seam. The flexible imaging member belt is produced by bisecting both ends of a flexible, substantially rectangular imaging member sheet at an angle relative to the first and second major exterior surfaces of the sheet. The sheet is looped and the angled ends are then overlapped, mated, and joined or fused together to form a flexible imaging member belt. The angled cross-sectional seam so produced exhibits ample strength in comparison to conventional overlapped seams with several morphological improvements.

In a further embodiment, an ultrasonically welded, butt-lap seamed flexible imaging member belt is generated by producing a substantially rectangular flexible imaging sheet having two opposite ends, bisecting the opposite ends of the sheet at a cross-sectional angle relative to the sheet's first and second major exterior surfaces to generate a pair of matching, or complementary, slant-cut angles, forming a loop with the sheet and bringing the opposite ends together for mating, and ultrasonically welding the mated opposite ends together to form a thin and smooth profile welded seam having an angled butt-lap seam morphology.

The resulting flexible imaging member belt has a smooth surface profile, little or no seam protrusion spots, a significant reduction in seam region thickness, and provides seam region physical continuity as well.

Electrostatographic flexible belt imaging member may be prepared by various techniques. A typical flexible supporting substrate is provided with an electrically conductive surface. For electrophotographic imaging members, at least one photoconductive layer is then applied to the electrically conductive surface. A hole or electron blocking layer may be applied to the electrically conductive surface prior to the application of the photoconductive layer. If desired, an adhesive layer may be utilized between the hole or electron blocking layer and the photoconductive layer. For multilayered photoreceptors, a charge generation layer is usually applied onto the hole or electron blocking layer and a charge transport layer is subsequently coated over the charge generation layer. For ionographic imaging members, an electrically insulating dielectric layer is applied directly onto the electrically conductive surface.

The supporting substrate may be opaque or substantially transparent and may comprise numerous materials having the required mechanical properties. Accordingly, the substrate may comprise a layer of an electrically non-conductive or conductive material such as an inorganic or an organic composition. As electrically non-conducting materials there may be employed various thermoplastic resins known for this purpose including polyesters, polycarbonates, polyamides, polyurethanes, and the like which are flexible in thin webs. The electrically insulating or conductive substrate should be flexible and in the form of an endless flexible belt. Preferably, the endless flexible belt shaped substrate comprises a commercially available biaxially oriented polyester.

The thickness of the supporting substrate layer depends on numerous factors, including seam strength, mechanical toughness, and economical considerations. Thus, the substrate layer used for a flexible belt application may be of substantial thickness, for example, about 150 micrometers, or of a minimum thickness of about 50 micrometers, provided that it produces no adverse effects on the belt. Preferably, the thickness of the substrate layer is between about 75 micrometers and about 100 micrometers for optimum flexibility, beam rigidity, and minimum stretch during cycling.

Where a separate flexible conductive layer is employed, it may vary in thickness over substantially wide ranges depending on the optical transparency and degree of flexibility desired for the electrostatographic member. Accordingly, for a flexible electrophotographic imaging device, the thickness of the conductive layer may be between about 20 angstroms and about 750 angstroms, and more preferably between about 100 angstroms and about 200 angstroms for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, copper, gold, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contain a thin metal oxide layer that has formed on the outer surface of an oxidizable metal layer. A typical electrical conductivity for conductive layers for electrophotographic imaging members in slow speed copiers is about 10-2 to 10-3 per ohms/square.

After formation of an electrically conductive surface, a hole blocking or electron blocking layer, hereinafter referred to as a charge blocking layer, may be applied thereto for photoreceptors. Generally, electron blocking layers for positively charged photoreceptors allow holes from the imaging surface of the photoreceptor to migrate toward the conductive layer and hole blocking layers for negatively charged photoreceptors allow electrons from the imaging surface of the photoreceptor to migrate toward the conductive layer. Any suitable charge blocking layer capable of forming an electronic barrier to holes or electrons between the adjacent photoconductive layer and the underlying conductive layer may be utilized. The charge blocking layer may be applied by any suitable conventional technique such as spraying, dip coating, draw bar coating, gravure coating, silk screening, air knife coating, reverse roll coating, vacuum deposition, chemical treatment and the like. The charge blocking layer should be continuous and have a dry thickness of less than about 0.2 micrometer.

An adhesive layer is usually applied to the charge blocking layer. Any suitable adhesive layer well known in the art may be utilized. Typical adhesive layer materials include, for example, polyesters, polyurethanes, and the like. Satisfactory results may be achieved with the adhesive layer thickness between about 0.05 micrometer and about 0.3 micrometer. Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable charge generating (photogenerating) layer may be applied onto the adhesive layer. Charge generating layers are well know in the art and can comprise homogeneous layers or photoconductive particles dispersed in a film forming binder. Examples of charge generating layers are described, for example, in U.S. Pat. No. 3,357,989, U.S. Pat. No. 3,442,781, and U.S. Pat. No. 4,415,639, the disclosures thereof being incorporated herein in their entirety. Other suitable photogenerating materials known in the art may also be utilized, if desired.

Any suitable polymeric film forming binder material may be employed as the matrix in of the photogenerating layer. Typical polymeric film forming materials include those described, for example, in U.S. Pat. No. 3,121,006, the disclosure thereof being incorporated herein in its entirety. The photogenerating composition or pigment may be present in the film forming binder composition in various amounts. Generally, from about 5 percent by volume to about 90 percent by volume of the photogenerating pigment is dispersed in about 10 percent by volume to about 90 percent by volume of the resinous binder. Preferably from about 20 percent by volume to about 30 percent by volume of the photogenerating pigment is dispersed in about 70 percent by volume to about 80 percent by volume of the resinous binder composition.

The photogenerating layer generally ranges in thickness from about 0.1 micrometer to about 5 micrometers, and more preferably from about 0.3 micrometer to about 3 micrometers. The photogenerating layer thickness is related to binder content. Higher binder content compositions generally require thicker layers for photogeneration.

Any suitable and conventional technique may be utilized to mix and thereafter apply the photogenerating layer coating mixture to the previously dried adhesive layer. Drying of the deposited coating may be effected by any suitable conventional technique.

The charge transport layer may comprise any suitable transparent organic polymer or non-polymeric material capable of supporting the injection of photogenerated holes or electrons from the charge generating layer and allowing the transport of these holes or electrons through the organic layer to selectively discharge the surface charge. The charge transport layer not only serves to transport holes or electrons, but also protects the photoconductive layer from abrasion or chemical attack. The charge transport layer should exhibit negligible, if any, discharge when exposed to a wavelength of light useful in xerography, e.g. 4000 Angstroms to 9000 Angstroms. The charge transport layer is normally transparent in a wavelength region in which the electrophotographic imaging member is to be used when exposure is effected therethrough to ensure that most of the incident radiation is utilized by the underlying charge generating layer. When used with a transparent substrate, imagewise exposure or erase may be accomplished through the substrate with all light passing through the substrate. In this case, the charge transport material need not transmit light in the wavelength region of use if the charge generating layer is sandwiched between the substrate and the charge transport layer. The charge transport layer in conjunction with the charge generating layer is an insulator to the extent that an electrostatic charge placed on the charge transport layer is not conducted in the absence of illumination. Charge transport layer materials are well known in the art.

The charge transport layer may comprise activating compounds or charge transport molecules dispersed in normally electrically inactive film forming polymeric materials. These charge transport molecules may be added to polymeric materials which are incapable of supporting the injection of photogenerated holes and incapable of allowing the transport of these holes. An especially preferred charge transport layer employed in multilayer photoconductors comprises from about 25 percent to about 75 percent by weight of at least one charge transporting aromatic amine, and about 75 percent to about 25 percent by weight of a polymeric film forming resin in which the aromatic amine is soluble. Examples of typical charge transporting aromatic amines include triphenylmethane, bis(4-diethylamine-2-methylphenyl)phenylmethane; 4'-4"-bis(diethylamino)-2',2"-dimethyltriphenylmethane; N,N'-bis(alkylphenyl)-(1,1'-biphenyl)-4,4'-diamine wherein the alkyl is, for example, methyl, ethyl, propyl, n-butyl, etc.; N,N'-diphenyl-N,N'-bis(3"-methylphenyl)-(1,1' biphenyl)-4,4' diamine; and the like, dispersed in an inactive resin binder.

Any suitable inactive thermoplastic resin binder may be employed. Typical inactive resin binders include polycarbonate resins, polyvinylcarbazole, polyester, polyarylate, polyacrylate, polyether, polysulfone, and the like. Molecular weights can vary from about 20,000 to about 150,000.

The thickness of the charge transport layer may range from about 10 micrometers to about 50 micrometers, and preferably from about 20 micrometers to about 35 micrometers. Optimum thicknesses may range from about 23 micrometers to about 31 micrometers.

An optional conventional ground strip may be utilized along one edge of the electrophotographic imaging member. The ground strip may comprise a film forming polymer binder and electrically conductive particles. The ground strip may comprise materials such as those enumerated in U.S. Pat. No. 4,664,995. The ground strip layer may have a thickness from about 7 micrometers to about 42 micrometers, and preferably from about 14 micrometers to about 23 micrometers.

An optional conventional anti-curl layer may also be employed. The anti-curl layer may comprise thermoplastic organic polymers or inorganic polymers that are electrically insulating or slightly semi-conductive. The anti-curl layer provides flatness and/or abrasion resistance and may also contain microcrystalline silica or organic particulates to improve its frictional and wear properties. The anti-curl layer is formed at the back side of the substrate, opposite to the imaging layers. The thickness of the anti-curl layer is from about 3 micrometers to about 35 micrometers. An example of an anti-curl backing layer is described in U.S. Pat. No. 4,654,284, the entire disclosure of this patent being incorporated herein by reference.

An optional conventional overcoating layer may also be used. The optional overcoating layer may comprise organic polymers or inorganic polymers that are electrically insulating or slightly semi-conductive. The overcoating layer may range in thickness from about 2 micrometers to about 8 micrometers, and preferably from about 3 micrometers to about 6 micrometers.

For electrographic imaging members, a flexible dielectric layer overlying the conductive layer may be substituted for the photoconductive layers. Any suitable, conventional, flexible, electrically insulating dielectric thermoplastic polymer may be used in the dielectric layer of the electrographic imaging member. If desired, the concept of the morphologically improved seam configuration of this disclosure may be extended to flexible belts having different material compositions where cycling durability is important.

The above processes, compositions and materials can be utilized to produce a seamed flexible imaging member belt having a sufficient strength, smooth surface profile with little or no seam protrusion spots and little, if any, increase in seam thickness.

BRIEF DESCRIPTION OF THE DRAWINGS

A more complete understanding of the processes and apparatuses disclosed herein can be obtained by reference to the accompanying drawings. These figures are merely schematic representations based on convenience and the ease of demonstrating the existing art and the present development, and are, therefore, not intended to indicate relative size and dimensions of the flexible imaging member belts or components thereof and/or to define or limit the scope of the exemplary embodiments.

Figure 1:
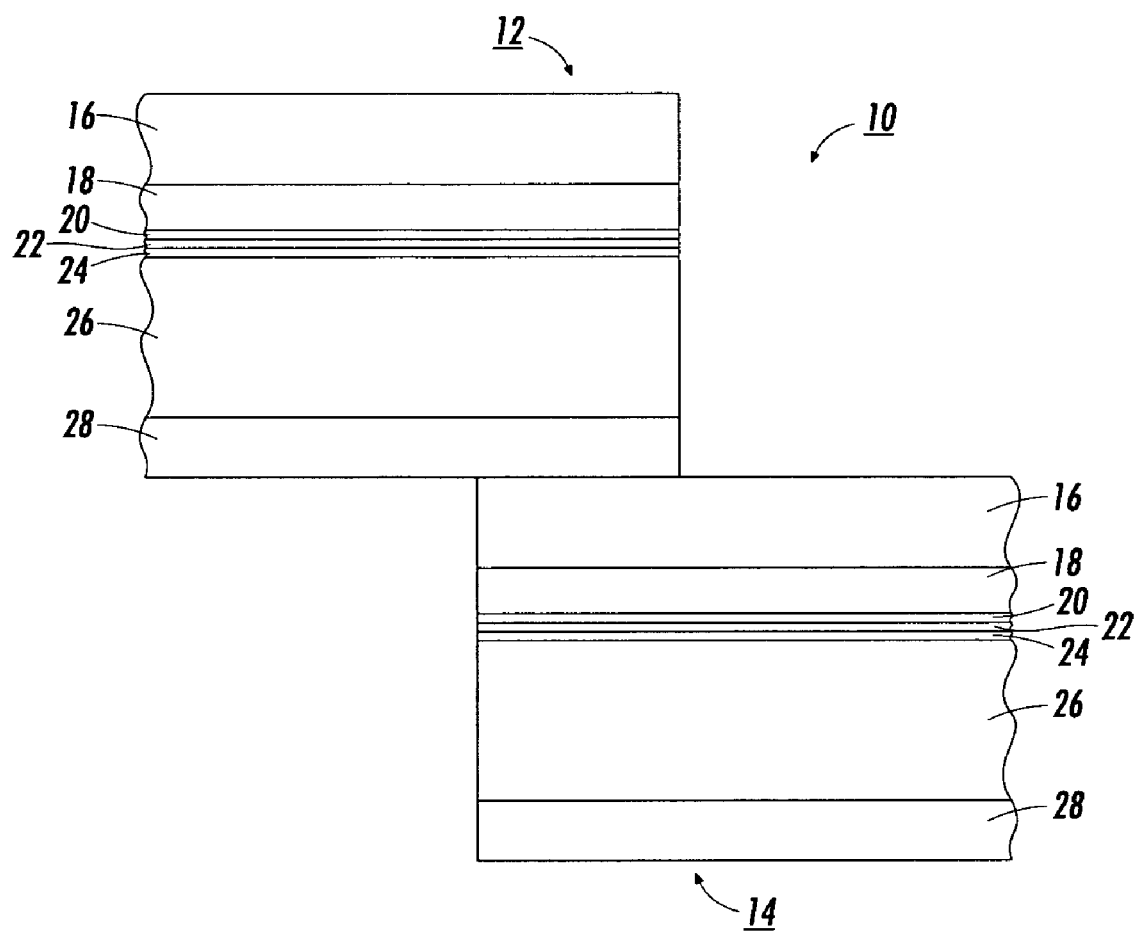
FIG. 1 illustrates a schematic partial cross-sectional view of a known, looped multiple layered flexible sheet of electrophotographic imaging member material having vertically cut opposite ends in an overlapped position.

Still further advantages and benefits of the present exemplary embodiments will become apparent to those of ordinary skill in the art upon reading and understanding the following detailed description of the preferred embodiments.

DETAILED DESCRIPTION

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring to FIG. 1, there is illustrated a flexible electrophotographic imaging member 10 in the form of a looped sheet having a first end marginal region 12 overlapping a second end marginal region 14 to form an overlap region ready for a known seam forming operation. The flexible electrophotographic member 10 can be utilized within an electrophotographic imaging device and may be a single film substrate member or a member having a film substrate layer combined with one or more additional coating layers. At least one of the coating layers comprises a film forming binder.

The flexible electrophotographic imaging member 10 may be a single layer or a multiple layer type photoreceptor. If the flexible electrophotographic imaging member 10 is to be a negatively charged photoreceptor device, the flexible electrophotographic imaging member 10 may comprise a charge generator layer sandwiched between a conductive surface and a charge transport layer. Alternatively, if the flexible imaging member 10 is to be a positively charged photoreceptor device, the flexible imaging member 10 may comprise a charge transport layer sandwiched between a conductive surface and a charge generator layer.

The layers of the flexible electrophotographic imaging member 10 can comprise numerous suitable materials having suitable mechanical properties. Examples of typical layers are described in U.S. Pat. No. 4,786,570; U.S. Pat. No. 4,937, 117; and, U.S. Pat. No. 5,021,309, the entire disclosures thereof being incorporated herein by reference. The belt of flexible electrophotographic imaging member 10 shown in FIG. 1, including the two end marginal regions 12 and 14, comprises from top to bottom a charge transport layer 16, a generator layer 18, an interface layer 20, a blocking layer 22, a conductive ground plane layer 24, a supporting layer 26, and an anti-curl back coating layer 28. It should be understood that the thicknesses of the layers in the embodiment of FIG. 1 are conventional and that a wide range of thicknesses can be used for each of the layers.

Figure 2:
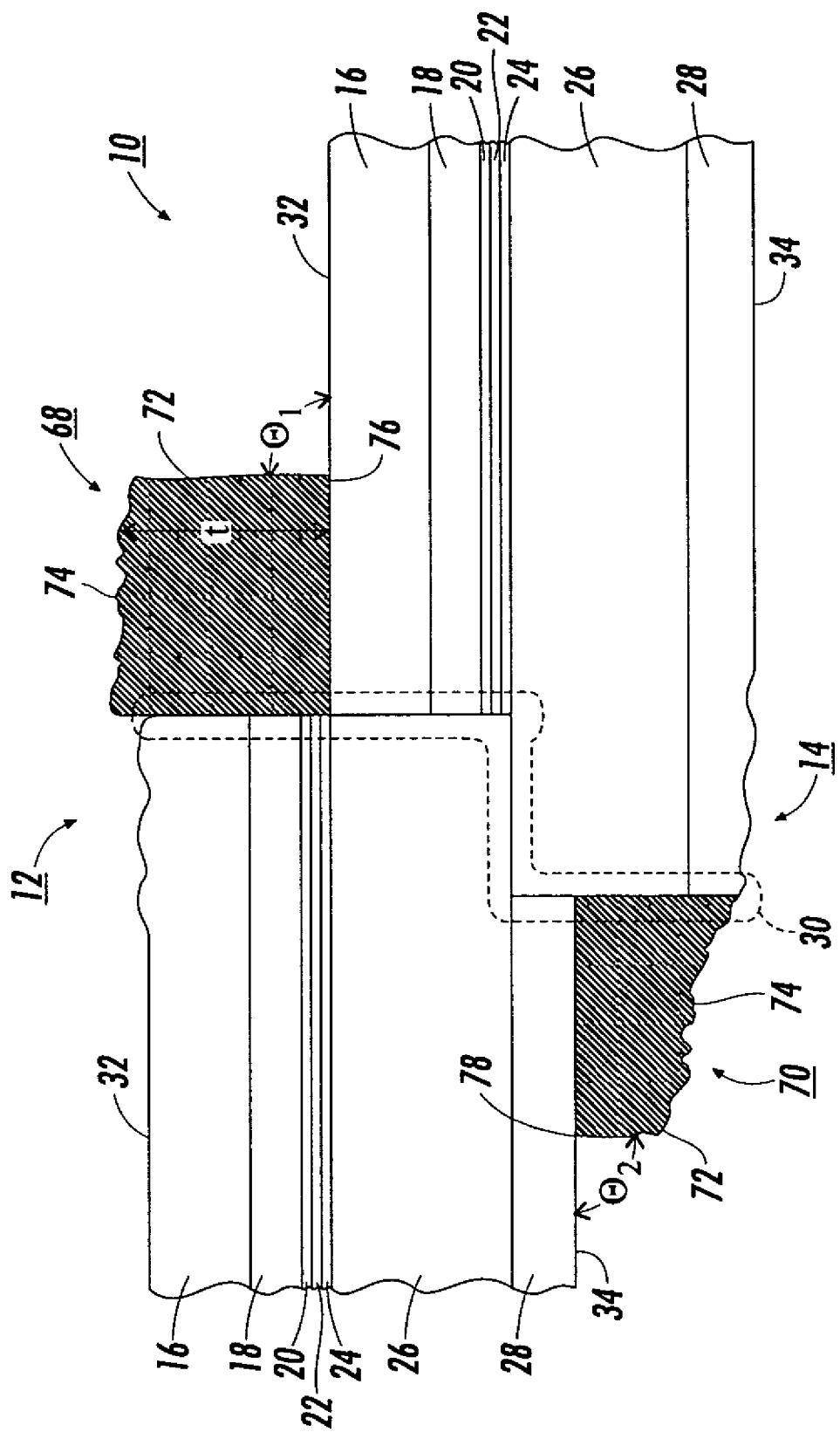
FIG. 2 shows a schematic partial cross-sectional view of a typical multiple layered seamed flexible electrophotographic imaging member belt derived from the sheet illustrated in FIG. 1 after ultrasonic seam welding.

The end marginal regions 12 and 14 can be joined by any suitable means including gluing, taping, stapling, pressure and heat fusing to form a continuous member such as a belt, sleeve, or cylinder, nevertheless, from the viewpoint of considerations such as ease of belt fabrication, short operation cycle time, and the mechanical strength of the fabricated joint, the ultrasonic welding process is preferably used to join the end marginal regions 12 and 14 of flexible electrophotographic imaging member sheet 10 into a seam 30 in the overlap region, as shown in FIG. 2, to form a seamed flexible electrophotographic imaging member belt 10.

As illustrated in FIG. 2, the location of seam 30 is indicated by a dotted line. Seam 30 comprises two vertical portions joined by a horizontal portion. Thus, the midpoint of seam 30 may be represented by an imaginary centerline extending the length of seam 30 from one edge of belt 10 to the opposite edge, the imaginary centerline (not shown) running along the middle of the horizontal portion which joins the two vertical portions illustrated in FIG. 2. In other words, a plain view (not shown) of the horizontal portion of seam 30 would show a strip much like a two lane highway in which the centerline would be represented by the white divider line separating the two lanes, the two lanes comprising end marginal regions 12 and 14. The flexible electrophotographic imaging member 10 is thus transformed from a sheet of electrophotographic imaging member material as illustrated in FIG. 1 into a continuous electrophotographic imaging member belt as illustrated in FIG. 2.

The flexible electrophotographic imaging member 10 has a first major or upper exterior surface or side 32 and a second major or lower exterior surface or side 34 on the opposite side. The seam 30 joins the flexible electrophotographic imaging member 10 so that the lower surface 34 (generally including at least one layer immediately above) at and/or near the first end marginal region 12 is integral with the upper surface 32 (generally including at east one layer immediately below) at and/or near the second end marginal region 14.

A preferred heat/pressure joining means includes ultrasonic welding to transform the sheet of photoconductive imaging material into a photoreceptor belt. The belt can be fabricated by ultrasonic welding of the overlapped opposite end regions of a sheet. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Figure 3:
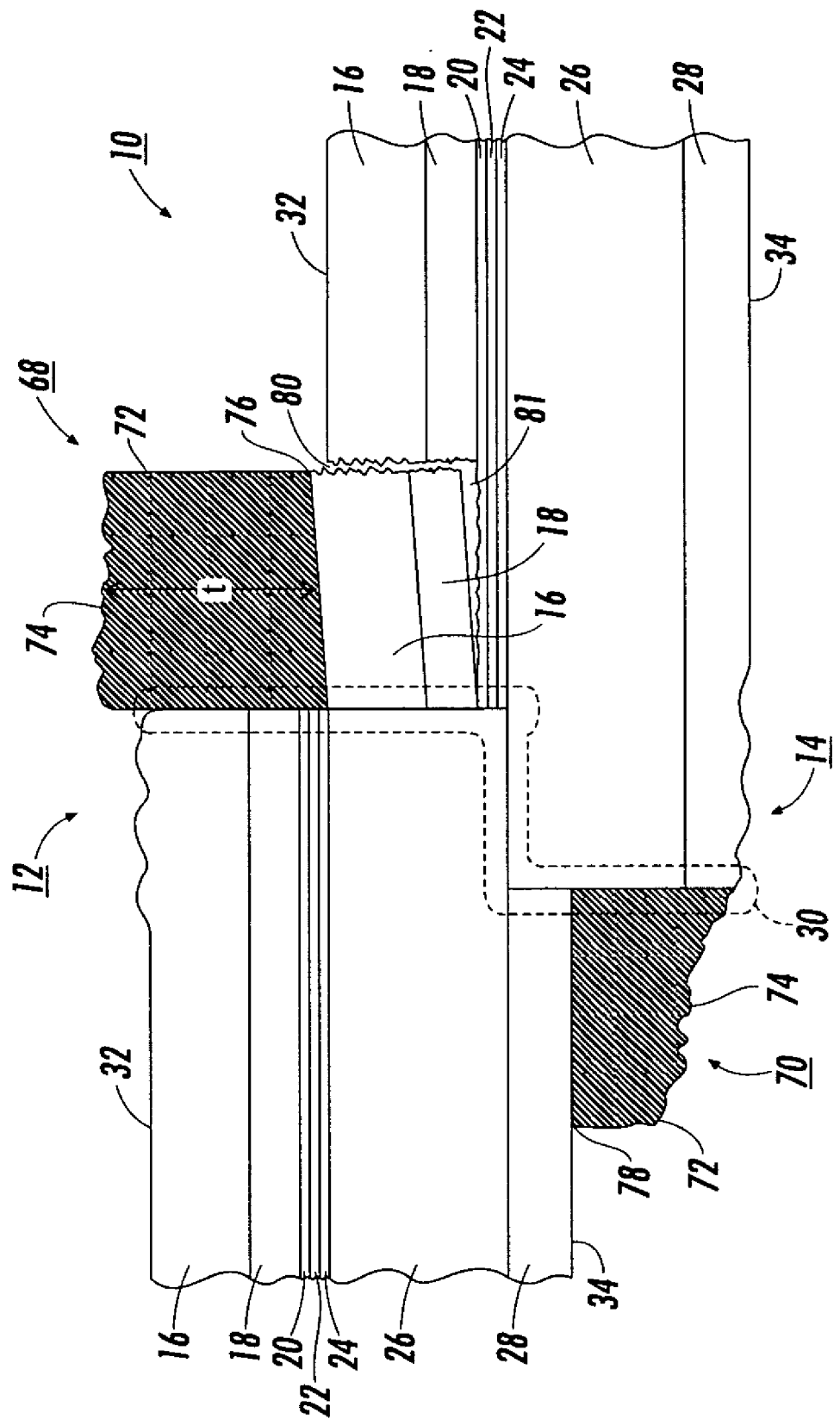
FIG. 3 illustrates a schematic partial cross-sectional view of a multiple layered seamed flexible electrophotographic imaging member belt of FIG. 2 which has mechanical failure due to fatigue induced seam area cracking/delamination.

Upon completion of welding the overlap region of the flexible electrophotographic imaging member sheet into a seam 30 using ultrasonic seam welding technique, the overlap region is transformed into an overlapping and abutting region as illustrated in FIGS. 2 and 3. Within the overlapping and abutting region, the portions of the flexible electrophotographic imaging member 10, which once formed the end marginal regions 12 and 14, are joined by the seam 30 such that the once end marginal regions 12 and 14 are overlapping and abutting one another. The welded seam 30 contains upper and lower splashings 68 and 70 at each end thereof as illustrated in FIGS. 2 and 3.

The splashings 68 and 70 are formed in the process of joining the end marginal regions 12 and 14 together. Molten material is necessarily ejected from either side of the overlap region to facilitate direct support layer 26 to support layer fusing and results in the formation of the splashings 68 and 70. The upper splashing 68 is formed and positioned above the overlapping end marginal region 14 abutting the top surface 32 and adjacent to and abutting the overlapping end marginal region 12. The lower splashing 70 is formed and positioned below the overlapping end marginal region 12 abutting bottom surface 34 and adjacent to and abutting the overlapping end marginal region 14. The splashings 68 and 70 extend beyond the sides and the edges of the seam 30 in the overlap region of the welded flexible electrophotographic imaging member 10. The extension of the splashings 68 and 70 beyond the sides and the edges of the seam 30 is undesirable for many machines such as electrophotographic copiers, duplicators and copiers that require precise edge positioning of a flexible electrophotographic imaging member 10 during machine operation. Generally, the extension of the splashings 68 and 70 at the belt edges of the flexible electrophotographic imaging member 10 are removed by a notching operation.

A typical upper splashing 68 has a height or thickness t of about 90 micrometers and projects about 17 microns above the surface of the overlapping end marginal region 12. Each of the splashings 68 and 70 has an uneven but generally rectangular shape including one side (free side) 72 (which forms a free end) extending inwardly toward top surface 32 from an outwardly facing side 74 (extending generally parallel to either the top surface 32 or the bottom surface 34). The free side 72 of the splashing 68 forms an approximately perpendicular angle $\theta_1$ with the bottom surface 34 of the flexible electrophotographic imaging member 10. Likewise, the free side 72 of the splashing 70 forms an approximately perpendicular angle $\theta_2$ at the junction 78 of the free side 72 of the lower splashing 70 and the bottom surface 34 of the flexible imaging member belt 10. Likewise, a meeting or junction point 78 exists at the junction of the free side 72 of the lower splashing 70 and the bottom surface 34 of the flexible electrophotographic imaging member belt 10. Both junction points 76 and 78 provide focal points for the stress concentration and become the initial points of failure affecting the mechanical integrity of the flexible electrophotographic imaging member belt 10.

During machine operation, the seamed flexible electrophotographic imaging member belt 10 cycles or bends over rollers, particularly small diameter rollers, of a belt support module within an electrophotographic imaging apparatus. As a result of dynamic bending/flexing of the flexible electrophotographic imaging member belt 10 during cycling, the rollers repeatedly exert a force on the flexible imaging member belt 10 which causes large stresses to develop generally adjacent to the seam 30 due to the excessive thickness and material discontinuity thereof. The stress concentrations that are induced by bending near the junction points 76 and 78 may reach values much larger than the average value of the stress over the entire length of the flexible electrophotographic imaging member belt 10. The induced bending stress is inversely related to the diameters of a roller that the flexible imaging member 10 bends over and directly related to the thickness of the seam region of the flexible electrophotographic imaging member belt 10. When a structural member, such as the flexible electrophotographic imaging member belt 10, contains a sudden increase in cross-sectional thickness at the overlap region, high localized stress occurs near the discontinuity, e.g., junction points 76 and 78.

When the flexible electrophotographic imaging member belt 10 bends over the rollers of a belt module within an electrophotographic imaging apparatus, the bottom surface 34 of the flexible electrophotographic imaging member belt 10, which is adapted to contact the exterior surface of the roller, is compressed. In contrast, the top surface 32 is stretched under tension. This is attributable to the fact that the top surface 32 and bottom surface 34 move in a circular path about the circular roller. Since the top surface 32 is at greater radial distance from the center of the circular roller than the bottom surface 34, the top surface 32 must travel a greater distance than the bottom surface 34 in the same time period. Therefore, the top surface 32 must be stretched under tension relative to a generally central portion of the flexible electrophotographic imaging member belt 10 (the portion of the flexible electrophotographic imaging member belt 10 generally extending along the center of gravity of the flexible imaging member 10). Likewise, the bottom surface 34 must be compressed relative to the generally central portion of the flexible imaging member 10 (the portion of the flexible electrophotographic imaging member belt 10 generally extending along the center of gravity of the flexible electrophotographic imaging member belt 10). Consequently, the bending stress at the junction point 76 will be tension stress, and the bending stress at the junction point 78 will be compression stress.

Compression stresses, such as at the junction point 78, rarely cause seam 30 failure. Tension stresses, such as at junction point 76, however, are much more of a problem. The tension stress concentration at the junction point 76 in great likelihood will eventually result in crack initiation through the electrically active layers of the flexible electrophotographic imaging member belt 10 as illustrated in FIG. 3. The illustrated crack 80 is adjacent to the top splashing 68 of the second end marginal region 14 of the flexible electrophotographic imaging member belt 10. The generally vertically extending crack 80 initiated in the charge transport layer 16 continues to propagate through the generator layer 18. Inevitably, the crack 80 extends generally horizontally to develop seam delamination 81 which is propagated through the relatively weak adhesion bond between the adjoining surfaces of the generator layer 18 and the interface layer 20.

The formation of the local seam delamination 81 is typically referred to as seam puffing. The excess thickness of the splashing 68 and stress concentration at the junction 76 causes the flexible electrophotographic imaging member belt 10 to perform, during extended machine operation, as if a material defect existed therein. Thus, the splashing 68 tends to promote the development of dynamic fatigue seam 30 failure and can lead to separation of the joined end marginal regions 12 and 14 severing the flexible imaging member 10. Consequently, the service life of the flexible imaging member 10 is shortened.

In addition to seam failure, the crack 80 acts as a depository site and collects toner, paper fibers, dirt, debris and other unwanted materials during electrophotographic imaging and cleaning of the flexible electrophotographic imaging member belt 10. For example, during the cleaning process, a cleaning instrument, such as a cleaning blade, will repeatedly pass over the crack 80. As the site of the crack 80 becomes filled with debris, the cleaning instrument dislodges at least some portion of this highly concentrated level of debris from the crack 80. The amount of the debris, however, is beyond the removal capacity of the cleaning instrument. As a consequence, the cleaning instrument dislodges the highly concentrated level of debris but cannot remove the entire amount during the cleaning process. Instead, portions of the highly concentrated debris are deposited onto the surface of the flexible electrophotographic imaging member belt 10. In effect, the cleaning instrument spreads the debris across the surface of the flexible electrophotographic imaging member belt 10 instead of removing the debris therefrom.

In addition to seam failure and debris spreading, the portion of the flexible member 10 above the seam delamination 81, in effect, becomes a flap which moves upwardly. The upward movement of the flap presents an additional problem during the cleaning operation. The flap becomes an obstacle in the path of the cleaning instrument as the instrument travels across the surface of the flexible electrophotographic imaging member belt 10. The cleaning instrument eventually strikes the flap when the flap extends upwardly. As the cleaning instrument strikes the flap, great force is exerted on the cleaning instrument which can lead to damage thereof, e.g., excessive wear and tearing of the cleaning blade.

In addition to damaging the cleaning blade, the striking of the flap by the cleaning instrument causes unwanted vibration in the flexible electrophotographic imaging member belt 10. This unwanted vibration adversely affects the copy/print quality produced by the flexible electrophotographic imaging member belt 10. The copy/print is affected because imaging occurs on one part of the flexible imaging member 10 simultaneously with the cleaning of another part of the flexible imaging member 10.

Figure 4:
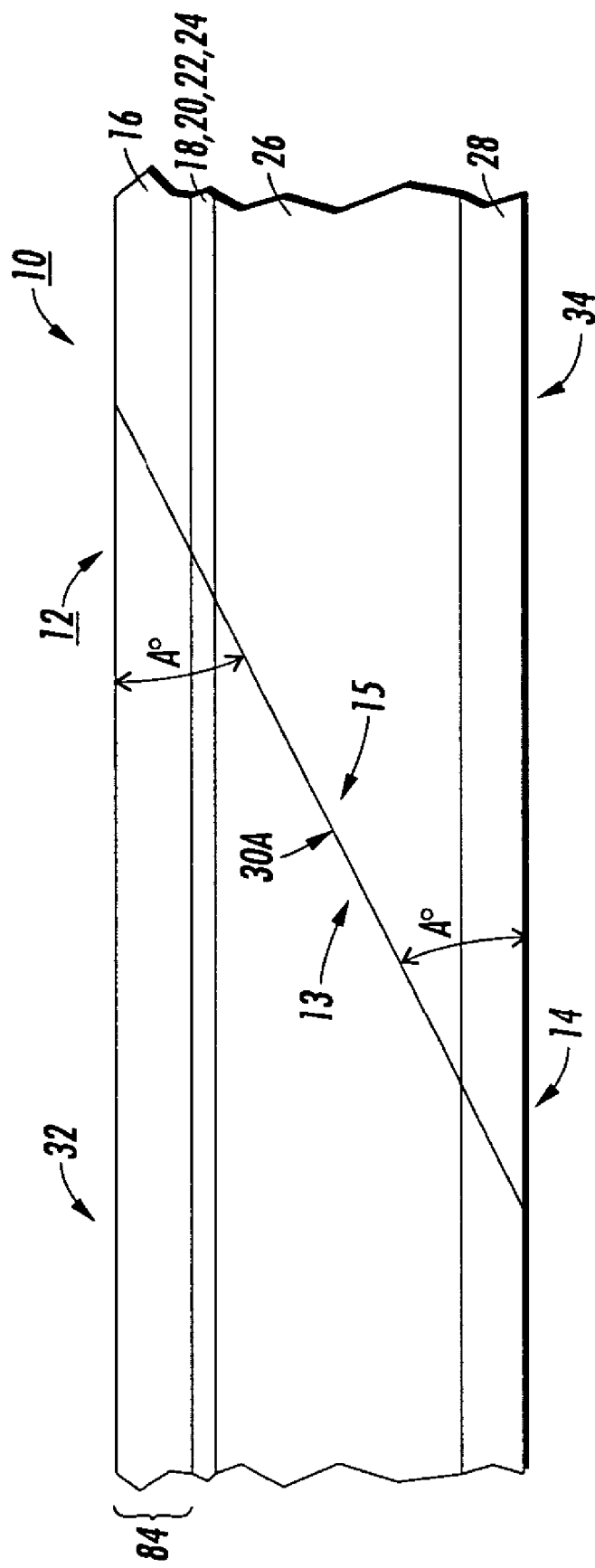
FIG. 4 shows the cross sectional side view of a seamed, flexible multiple layered electrophotographic imaging member belt of the present disclosure.

In FIG. 4, the cross-sectional side view is shown of an embodiment directed to an enhanced seam design formed by an ultrasonic welding process. In this view, a flexible electrophotographic imaging belt 10 is shown after material has been removed or displaced from both ends of a flexible, substantially rectangular sheet on an angle A° to form two new angled or sloped, substantially parallel, cross-sectional ends, 13 and 15. The sheet is then formed into a loop, the two new matching or complementary angled (or sloped) cross-sectional ends 13 and 15 are overlayed upon one another and/or mated, and subsequently joined together or fused, such as by an ultrasonic welding process, to form a seam 30A.

More particularly, illustrated in FIG. 4 is a schematic depiction of flexible imaging member 10 having a supporting substrate 26 sandwiched between an anti-curl backing layer 28 and composite layer 84 which schematically depicts (for purposes of illustration simplification) a combination of charge transport layer 16, charge generating layer 18, adhesive layer 20, charge blocking layer 22, and conductive layer 24. In FIG. 4, flexible imaging member 10 is shown after material has been removed from first major or lower exterior surface 34 adjacent and parallel to first edge 12 of flexible imaging member 10 at an angle A° to form a new first angled or sloped surface 13. Also shown is flexible imaging member 10 after material has been removed from second major or upper exterior surface 32 adjacent and parallel to second edge 14 to form a new second angled or sloped surface 15 which substantially complements the profile of the first new angled or sloped surface 13.

After first new angled or sloped surface 13 and second new angled or sloped surface 15 are brought into contact with each other to form a mated surface region and ultrasonically welded together, they form an excellent overlapped joint having a thickness substantially similar to the thickness of flexible imaging member 10 in regions that are not overlapped. This configuration of overlapped opposite edges of a sheet allows direct contact of the support substrate at both ends of the original sheet regions for intimate fusion to each other during an ultrasonic seam welding process. As a result, little or no molten mixtures of imaging layer material are ejected out to either side of the seam overlap. Direct fusing of supporting substrate 26 at new first surface 13 to supporting substrate 26 at new second surface 15 provides ample seam strength, because of the enlarged area of exposed supporting substrate 26 material that are mated, as well as enhanced support substrate contact for improved ultrasonic fusing.

In the embodiment shown in FIG. 4, seam 30A is the result of the joining of two overlayed, cross-sectional angular ends. In this regard, seam 30A is angled with respect to the upper and lower major surfaces of the abutted ends of the first end marginal region 12 and second end marginal region 14 to form a flexible electrophotographic imaging belt 10. Seam 30A is formed by an angular cut or slice through the cross-sectional thickness of belt 10 at end marginal regions 12 and 14 at a slanting angle A°. In comparison to the overlapping seam 30 counterpart of FIG. 2, seam 30A is a butt-lap hybrid joint that minimizes the physical discontinuity. Furthermore, the seam region created has a smoother surface with little or no added thickness and it is substantially free of upper and lower seam splashing.

To prepare the seam design of FIG. 4, the angled, opposite ends of the marginal regions 12 and 14 are created by specific tilted or slanted cross-sectional cutting techniques to produce a pair of substantially parallel, angular or beveled matching ends. When the sheet is looped, the angular or beveled ends are overlayed over one another, mated and joined or fused by, for example, sonic welding, to form a seam having a slant angle A°. The slant angle A° should be from about 5° to about 45° to effect proper mating and yield satisfactory seam welding operation. However, as a result of the difficulties in tilted or slanted cross-sectional cutting through the thickness of the belt 10 to create the pair of beveled or angled ends and optimum ultrasonic seam welding techniques, the slant angle A is, in embodiments, from about 5° to about 20° to yield enhanced seam rupture strength. Furthermore, it has been found that a slanted 19° cut angle, 40 kHz welded seam produces a smooth seam region topology, with reduced amount of seam splashings and very little added thickness. In this regard, it has been found that the highest differential in thickness between the angled butt-lap seam and the rest of the belt (the non-seamed portions of the belt) can be of almost zero, or from about +5 to about +30 micrometers to produce acceptable seam quality improvement result. In embodiments, the thickness differential may be in the range of from about +8 to about +20 micrometers based from optimum ease of ultrasonic seam welding operation for good seam bonding strength consideration.

A satisfactory overlap width (i.e., mated surface region or contiguous contact width), measured in a direction perpendicular to the length of the mated surface region (i.e., measured in a direction transversely of the final belt), is between about 0.5 millimeters and about 1.8 millimeters. In embodiments, the overlap length is between about 0.8 millimeters and about 1.5 millimeters. Optimum overlap for best overall seam quality improvement is achieved with an overlap width of between about 1.0 millimeters and about 1.3 millimeters. The overlap width should preferably be at least about 7 times greater than the thickness of the belt.

The final welded belt has, in embodiments, a maximum differential in seam centerline thickness of less than about +25 percent of the thickness of the sheet prior to forming into a seamed belt to minimize the adverse effects of collisions between the seam or components thereof and various subsystems of electrostatographic imaging systems. In embodiments, the minimum differential in seam centerline thickness is more than about +4.5 percent of the thickness of the sheet prior to forming any seam to avoid any pronounced depression which could collect toner particles and other undesirable debris.

The surface profile of the new first angular or sloped surface and the new second surface, respectively, of flexible imaging member 10 can be modified (by including altering the shape thereof and reducing the thickness thereof) by any suitable well known technique. Typical surface treatment methods include chemical treatment and mechanical treatment such as abrasion, grinding, slicing, laser ablation, or polishing.

For example, in addition to the mentioned tilted or slanted cross-sectional cutting techniques, the two opposite ends of marginal regions 12 and 14 having vertical or perpendicular cuts can alternatively be created, as demonstrated above, and then modified by adopting a super polishing process to displace or remove materials within the belt surfaces to produce a pair of angled, matching or reciprocal ends for mating and ultrasonic welding. This process will also yield the seam design set forth in FIG. 4.

The angled or beveled ends may be created using a blade or knife and cutting through the imaging sheet at the desired angle. In embodiments, a blade or knife is a component of an apparatus that is suitable for maintaining the blade at the desired angle and allows for repeatable cuts, with respect to the surface angle, to be made. An example of a suitable apparatus is shown in FIGS. 7-11. A cutting assembly in accordance with the embodiment in FIGS. 7-11 generally comprises a support member and a blade support member attached to the support member. A cutting blade is attached to the blade support member such that the cutting blade is provided at an angle relative to the surface of the imaging sheet to provide the desired cross-sectional angled cut. The blade support member may be fixedly connected to the support member or may be pivotably connected to the support member.

With reference to the embodiment in FIGS. 7-11, a cutting assembly 100 includes a primary support member 120, a blade support member 140 connected to the primary support member, and a blade mount assembly 170 connected to the blade support member. Each of the primary support member and the blade support member includes a proximate end, a distal end, an upper surface, a lower surface, and opposing side surfaces. As shown in the embodiment in FIGS. 7-11, primary support member 120 includes a recessed portion 126 (along the right surface) extending from the proximate end 123 and from the bottom 125. Blade support member 140 is positioned in recess 126 and is pivotably connected to primary support member 120 via pin 133 that is inserted through apertures 154 of the blade support member and corresponding aperture 134 of the primary support member. In other embodiments, support member 120 does not include a recess, and blade support member may be connected to one of the side surfaces.

A blade mount assembly 170, which comprises a cutting blade 174, is attached to blade support member 140. In embodiments, a blade assembly may be fixedly attached to the blade support member. In the embodiments in FIGS. 7-11, blade assembly 170 is releasably attached to blade support member 140. Blade assembly 170 includes blade mounting body 172 having a cutout portion 173 disposed along the bottom edge of mounting body 172, a blade or knife 174, and bracket 180. A portion of the blade 174 is dimensioned to fit in cutout portion 173 of mounting body 172. A blade locking fastener 181 is inserted through aperture 182. Blade locking fastener 181 includes collar 183 that is dimensioned to fit in slit 178 of blade 174. Blade support member 140 includes a support arm 142 and a lower portion 150 integral with support arm 142 and disposed toward the proximate end of support member 140. Blade support member 140 also includes a slot 152 dimensioned for receiving mounting body 172 of blade mount assembly 170. As shown in FIGS. 7-11, support arm 142 includes apertures 160 and 161. Aperture 160 is in alignment with and extends into slot 152. A fastener 189 may be inserted into aperture 160 and subsequently into bore 188 of mounting body 172 to fasten blade mounting assembly 170 to blade support member 140.

The desired angle position of blade 176 is achieved by the manner in which the blade assembly is connected to the blade support member (such as blade support member 140). For example, with reference to the embodiment in FIGS. 7-11, support arm 142 is angled relative to support member 120 and slot 152 is perpendicular to support arm 142 such that, when blade mount assembly 170 is connected to blade support member 140, blade assembly 174 is oriented at an angle relative to the lower surface 151, of blade support member 140, which is generally substantially parallel with the surface of an associated imaging sheet to be cut. In alternative embodiments, support arm 142 of blade support member 140 may be substantially parallel to support member 120 and/or the imaging sheet to be cut, but the blade assembly 170 is connected or mounted to the support arm or blade support member in a manner such that it is positioned at an angle relative to the imaging sheet to be cut. The cutting blade is therefore oriented at an angle relative to the surface of an imaging sheet to provide an angled or beveled cut along the imaging sheet.

The cutting blade is generally positioned at a fixed angle relative to the surface to be cut. This is desirable to produce substantially identical surface cuts at successive cutting locations along the imaging sheet member. The angle may be changed by moving the blade assembly up or down in slot 152. In embodiments, the angle may be changed by resting the blade mount assembly 170 on a vacuum, which is used to hold the imaging sheet member in place during cutting. This causes the blade to be slightly flexed and changes the angle of the blade.

The magnitude of the angled or beveled cut may be selected as desired for a particular purpose or intended use, but in accordance with the present disclosure is less than about 90°. In one embodiment, the angled or beveled cut is about 45° or less. In another embodiment, the angled or beveled cut is about 30° or less. In still another embodiment, the angled or beveled cut is about 15° or less. In a further embodiment, the angled or beveled cut is from about 5° to about 15°.

To ensure that the cutting blade maintains contact with the imaging sheet to be cut, the blade support member may be downwardly biased toward the surface of the imaging sheet. In embodiments, the blade support member, and hence the blade assembly, are downwardly biased by a force sufficient to bias the blade support member and blade assembly downward but maintain the blade support member and blade assembly in a selected position. With reference to the embodiment in FIGS. 7-11, the biasing force is achieved with a spring 224 connected to pins 220 and 222. Pin 222 is positioned in aperture 147 located in upper flange 146 of blade support member 140. Pin 220 is substantially parallel with pin 222 and is positioned in aperture 138 of flange 130 of support member 120. Pin 220 extends through cutout 148, which is recessed relative to the proximate end of blade support member 140. As shown in the embodiment in FIGS. 7-11 the spring 224 is hooked to pins 220 and 222 around grooves 221 and 223, respectively. Other means, to downwardly bias the blade support member include, but are not limited to air cylinder, electrical solenoid, and the like.

In embodiments, the cutting assembly may include a means for retaining the blade support arm in a downwardly biased position. With reference to the embodiment in FIGS. 7-11, the means to retain blade support member in a downwardly biased position is provided by screw 250. Screw 250 is releasably inserted into aperture 132 of threaded bore 252. Threaded bore 252 is exposed along the vertical surface of recess 126. Screw 250 may be moved into bore 252 such that screw 252 contacts the upper surface of portion 144 of blade support member 140 and prevents blade support member 140 from being pivoted upwardly. This may be useful to prevent the blade support member and the blade from being pivoted upward during a cutting operation, which may result in a discontinuous or non-uniform cut. The means for retaining the blade support member in a downwardly biased position may also include, but is not limited to, retainer clips, a wedge, a pin, and the like.

Figure 12:
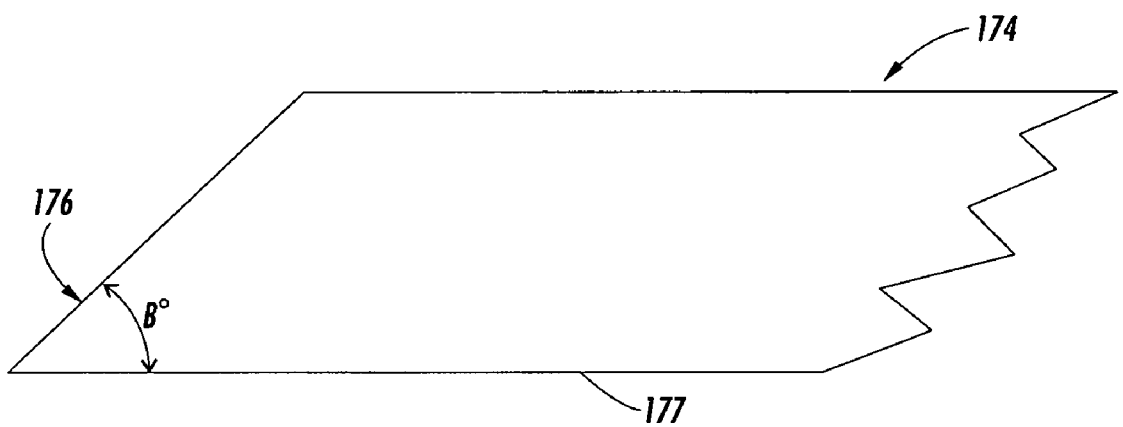
FIG. 12 is a detail of an embodiment of an embodiment of a cutting blade suitable for use with a cutting assembly in accordance with the disclosure.

In embodiments, cutting blade 174 is a single edge or chiseled edge configuration. With reference to FIG. 12, the cutting blade 174 is a chiseled edge blade having a generally flat or planar bottom 177 and an angled blade edge 176. The angle B of the blade is, in embodiments about 45° or less relative to the bottom flat surface 177 of the blade. In other embodiments, the chiseled edge blade has an angle of about 30° or less. In still other embodiments, the chiseled edge has an angle of about 15° or less. A double edge blade may be used, but is less desirable because the material being cut tends to ride up on the blade of a blade with a double edge configuration.

In embodiments, a cutting assembly may include a guide member such as guide member 230 positioned adjacent forward of the cutting blade along the direction in which the imaging sheet will be cut. With reference to the embodiment in FIGS. 7-11, cutting assembly 100 includes a guide member 230 positioned in slot 156 of blade support member 140. Guide member 230 is held in position by a pin inserted through apertures 158 of blade support member 140 and apertures 239 of guide member 230. As shown in the embodiment in FIGS. 8-13 slot 156 is a U-channel and the guide member 230 includes a flange 234 extending under one of the legs of the U-channel and positioned substantially adjacent to cutting blade 176. The guide member is formed from a relative soft polymeric material and is adapted to engage and ride along the surface of the imaging sheet to be cut prior to the knife. In this respect, the guide member is adapted to hold down the material or imaging sheet to be cut and keep the sheet from riding up and down the blade as the sheet is cut. In embodiments, at least a portion of the bottom surface of the guide member is generally planar and adapted to ride generally parallel to the surface of the imaging sheet to be cut. In the embodiment in FIGS. 7-11, the guide member 230 includes a portion 236 that is generally planar and capable of riding parallel to a surface of an imaging sheet to be cut. The guide member 230 also includes a lead edge 238 that is formed by a portion of the bottom surface of the guide member and angled upwardly away from portion 236. Without being bound to any particular theory, the use of a lead edge such as lead edge 238 reduces the shear force applied to the imaging sheet as the guide member comes in contact with the sheet. The guide member may be fixed in position or may be pivotable about the pin 240 such that the guide member may pivot to accommodate for contour changes or undulations along the surface of an imaging sheet to be cut.

Figure 13:
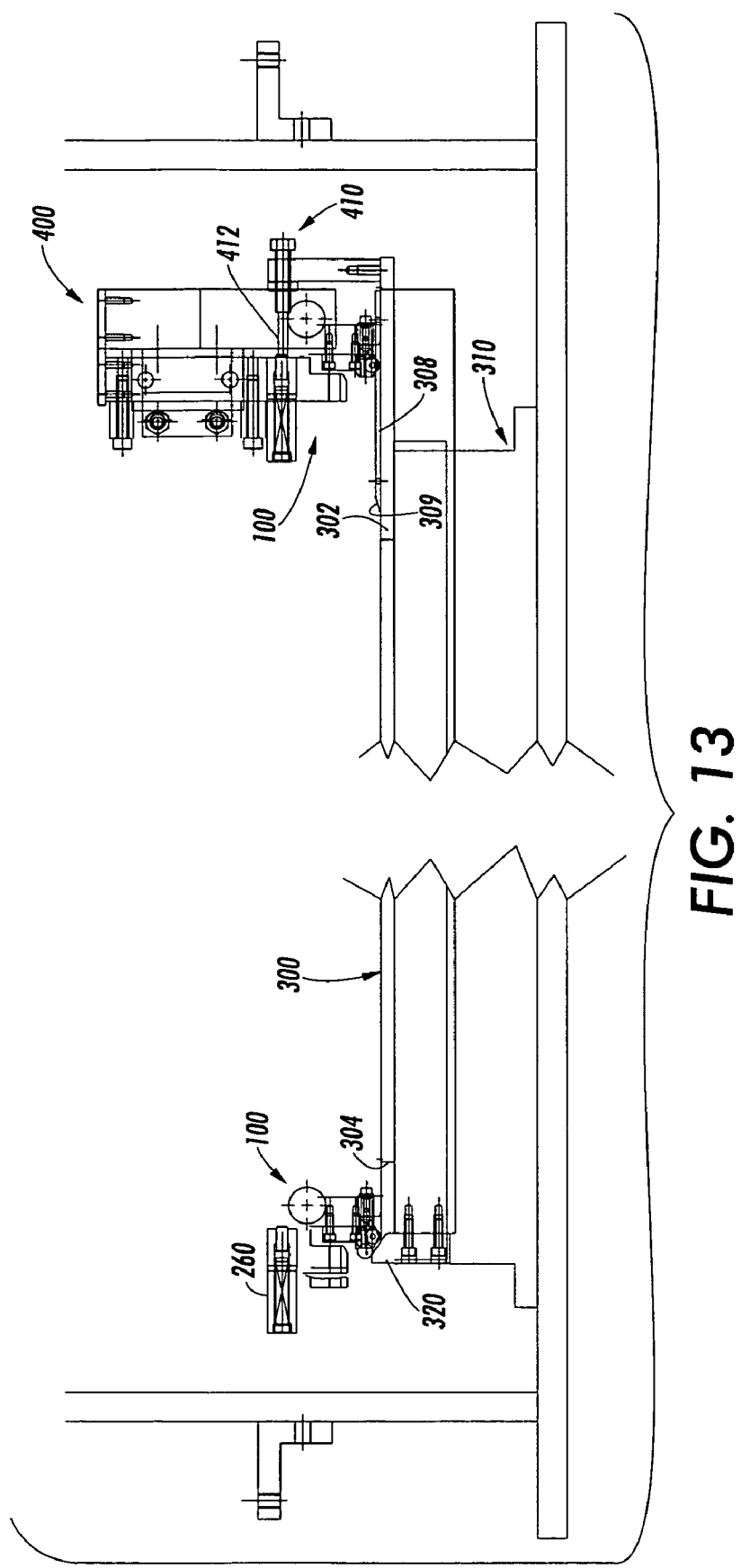
FIG. 13 is a schematic representation of an apparatus or system for forming an angled or beveled surface in an imaging member sheet employing the cutting assembly of FIG. 7.
Figure 14:
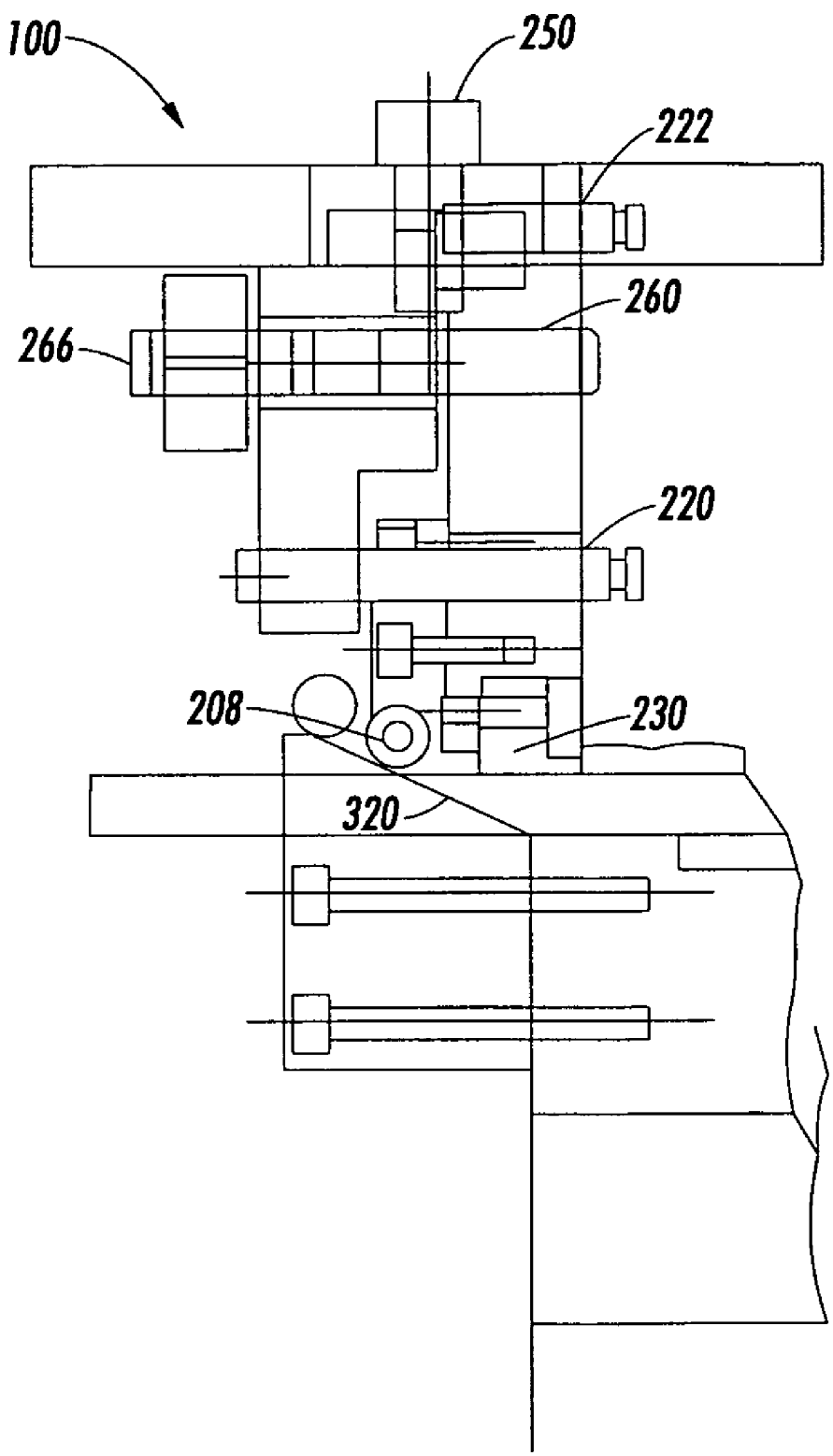
FIG. 14 is a detail of the left hand portion of the system of FIG. 13.

To cut an imaging sheet to provide an angled or beveled cut, an imaging sheet is provided and held in a fixed position. With reference to FIG. 13, an apparatus or system for providing angled surfaces on an imaging sheet with a cutting assembly in accordance with the present disclosure is shown. An imaging member sheet 300 may be supported or held in place on a support member, such as table or platen 310 and may be held in place by vacuum (not shown). A cutting tool 100, such as the cutting assembly 100 described with reference to FIGS. 7-11 is provided and positioned along a first or home edge of the apparatus. As shown in FIG. 14, the right side of the Figure represents the cutting assembly in a home or starting position and the left side represents the cutting assembly in an end position after a cut has been made. The blade support arm is positioned such that the guide member is in full contact with the first major exterior surface 302 of the imaging sheet and the cutting blade is cutting blade with the lower cutting surface. As shown in FIG. 13, roller 208 engages a surface of ramp portion 308. The cutting assembly is moved along the surface 308 and down the ramp 309 toward the first major exterior surface 302 of imaging member sheet 300. The cutting tool is then moved along the surface of the imaging sheet such that the cutting blade passes through the cross-sectional thickness of the imaging sheet to provide an angled or beveled cut. In embodiments, the cutting assembly is moved in a direction perpendicular to the major exterior surfaces 302, 304 of the imaging sheet. In other embodiments, the cutting tool may be moved at an angle greater than or less than 90° relative to the edges of the major exterior surfaces 302 and 304. The imaging tool is moved across the imaging sheet cutting through the thickness of the sheet to a second major exterior surface 304 or end position. After the cutting operation, and in no particular order, the cutting tool is moved back to the home position and the imaging sheet is pulled or moved to a desired length. The process is repeated again to provide a sheet with ends having matching angled or beveled cuts. The sheet is then looped and the angled or beveled cuts on the ends of the sheet to form a butt-lap seam.

In embodiments, a method is provided for positioning the cutting blade 176 above, i.e., off of, the surface of the imaging sheet prior to returning the cutting assembly to the home position. In the embodiment in FIGS. 13 and 14, a ramp 320 is provided at a position adjacent the second side major exterior surface 304 of the imaging sheet such that after the cutting blade passes through the second major exterior surface 304 of the imaging sheet, the cutting assembly continues to move in the cutting direction until a roller 208 attached to the blade support member 140 engages the ramp 320. As the roller moves up the ramp, a force is applied to the blade support member 140 sufficient to overcome the downward biasing force of spring 224, and the blade support member 140 is pivoted upward toward the top of support member 120. As shown in FIGS. 7-11, blade support member 140 includes a portion 144 integral with vertical flange 146 and support arm 142. A housing 260 is connected to support member 120 and comprises a retainer plunger pin for retaining the blade support member 140 in an upward position. Housing 260 is positioned within aperture 136 of support member 120. Housing 260 is a hollow cylindrical configuration with an aperture 260 dimensioned to receive plunger pin 268. A spring 264 is disposed within the hollow portion of housing 260 and is in engaging contact with plunger pin 268. An adjusting screw 266 is inserted into an end of the housing and applies a force on spring 264 sufficient to bias plunger pin 268 through aperture 261 of housing 260. As the roller engages and passes along the ramp 300, blade support member 140 is upwardly biased and aperture 145 on portion 144 is moved into alignment with aperture 136 of support member and aperture 261 of housing member 260. When aperture 145 aligns with aperture 261, the biasing force applied on plunger pin 268 by spring 264 causes plunger pin 268 to be released and extend through aperture 145. Plunger pin 268 then catches a portion of aperture 145. As the cutting assembly is moved back toward a home or starting position, the upward biasing force applied by roller 208 engaging the ramp is released and blade support member 140, and therefore blade 174, is maintained in an upward position above or off of the imaging sheet. When the cutting assembly is returned to the home position, a tool or device may be used to apply a force on and depress plunger pin 268 such that blade support member 140 is released and downwardly biased, such as by spring 224, to engage the imaging sheet to be cut. For example, in FIG. 13, when the cutting assembly 100 returns to the home position, a member 412 may be provided to engage and depress plunger pin 208 and release blade support member 140, which is downwardly biased such that the assembly is ready to begin a new cutting process.

The use of a cutting assembly, such as that described with reference to FIGS. 7-13, provides repeatable cuts at the same angle on successive marginal edges. It is desirable to produce successive cuts having substantially the same angled surface for mating the angled surfaces because the cuts that are being mated are not "sister" cuts. Providing a tool and method such as that of FIGS. 7-13 that produces repeatable cuts provides for better mating of the cuts and reduces the amount of weld splash associated with forming the seam when the marginal ends are welded together.

The seam designs disclosed herein are capable of providing imaging member belts with significant seam quality improvement to substantially enhance imaging member belt production yield and effectively reduce the belt unit manufacturing cost. Implementation of this seamed belt preparation not only eliminates the need of labor intensive and time consuming manual seam inspection procedures it also increases the production belt yields that are otherwise lost as rejects due to the presence of seam protrusion spots. Thus, the seaming of flexible imaging member belts according to this disclosure delivers a seam configuration, having significant improved qualities and better physical/mechanical attributes including smoother surface profile, little or no seam splashing, absence of protrusion spots, thinner cross-sectional thicknesses, and little or no physical discontinuity to enhance cleaning blade performance and suppress the premature onset of fatigue induced seam cracking/delamination frequently produced during extended electrophotographic imaging and cleaning processes.

A number of examples are set forth hereinbelow and are illustrative of different compositions and conditions that can be utilized in practicing the seam designs disclosed herein. All proportions are by weight unless otherwise indicated. It will be apparent, however, that the development can be practiced with many types of compositions and can have many different uses in accordance with the disclosure above and as pointed out hereinafter.

Example I

An electrophotographic imaging member web was prepared by providing a roll of titanium coated biaxially oriented thermoplastic polyester (PET, Melinex, available from ICI Americas Inc.) substrate having a thickness of 3 mils (76.2 micrometers). Applied thereto, using a gravure applicator, was a solution containing 50 parts by weight of 3-aminopropyltriethoxysilane, 50.2 parts by weight of distilled water, 15 parts by weight of acetic acid, 684.8 parts by weight of 200 proof denatured alcohol, and 200 parts by weight of heptane. This layer was then dried to a maximum temperature of 290° F. (143.3° C.) in a forced air oven. The resulting blocking layer had a dry thickness of 0.05 micrometer.

An adhesive interface layer was then prepared by applying to the blocking layer a wet coating containing 5 percent by weight, based on the total weight of the solution, of polyester adhesive (Mor-Ester 49,000, available from Morton International, Inc.) in a 70:30 volume ratio mixture of tetrahydrofuran/cyclohexanone. The adhesive interface layer was dried to a maximum temperature of 275° F. (135° C.) in a forced air oven. The resulting adhesive interface layer had a dry thickness of 0.07 micrometers.

The adhesive interface layer was thereafter coated with a photogenerating layer containing 7.5 percent by volume of trigonal selenium, 25 percent by volume of N,N'-dipheny-N,N'-bis(3-methylphenyl)-1,1'-biphenyl-4,4'-diamine, and 67.5 percent by volume of polyvinylcarbazole. This photogenerating layer was prepared by introducing 160 gms of polyvinylcarbazole and 2,800 mls of a 1:1 volume ratio of a mixture of tetrahydrofuran and toluene into a 400 oz. amber bottle. To this solution was added 160 gms of trigonal selenium and 20,000 gms of ⅛ inch (3.2 millimeters) diameter stainless steel shot. This mixture was then placed on a ball mill for 72 to 96 hours. Subsequently, 500 gms of the resulting slurry were added to a solution of 36 gms of polyvinylcarbazole and 20 gms of N,N'-diphenyl-N,N'-bis(3-methylphenyl)-1,1'-biphenyl-4,4'-diamine dissolved in 750 mls of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). However, a strip about 3 mm wide along one edge of the coating web, having the blocking layer and adhesive layer, was deliberately left uncoated by any of the photogenerating layer material to facilitate adequate electrical contact with the ground strip layer that is applied later. This photogenerating layer was dried to a maximum temperature of 280° F. (138° C.) in a forced air oven to form a dry thickness photogenerating layer having a thickness of 2.0 micrometers.

This coated imaging member web was simultaneously coated over with a charge transport layer and a ground strip layer by co-extrusion of the coating materials. The charge transport layer was prepared by introducing into an amber glass bottle in a weight ratio of 1:1 (or 50% wt of each) of N,N'-diphenyl-N,N'-bis(3-methylphenyl)-1,1'-biphenyl-4,4'-diamine and Makrolon 5705, a Bisphenol A polycarbonate thermoplastic having a molecular weight of about 120,000 commercially available from Farbensabricken Bayer A. G. The resulting mixture was dissolved to give 15 percent by weight solid in methylene chloride. This solution was applied on the photogenerator layer by extrusion to form a coating which upon drying gave a thickness of 24 micrometers.

The strip, about 3 mm wide, of the adhesive layer left uncoated by the photogenerator layer, was coated with a ground strip layer during the co-extrusion process. The ground strip layer coating mixture was prepared by combining 23.81 gms of polycarbonate resin (Makrolon 5705, 7.87 percent by total weight solids, available from Bayer A. G.), and 332 gms of methylene chloride in a carboy container. The container was covered tightly and placed on a roll mill for about 24 hours until the polycarbonate was dissolved in the methylene chloride. The resulting solution was mixed for 15-30 minutes with about 93.89 gms of graphite dispersion (12.3 percent by weight solids) of 9.41 parts by weight of graphite, 2.87 parts by weight of ethyl cellulose and 87.7 parts by weight of solvent (Acheson Graphite dispersion RW22790, available from Acheson Colloids Company) with the aid of a high shear blade dispersed in a water cooled, jacketed container to prevent the dispersion from overheating and losing solvent. The resulting dispersion was then filtered and the viscosity was adjusted with the aid of methylene chloride. This ground strip layer coating mixture was then applied, by co-extrusion with the charge transport layer, to the electrophotographic imaging member web to form an electrically conductive ground strip layer having a dried thickness of about 14 micrometers.

The resulting imaging member web containing all of the above layers was then passed through a maximum temperature zone of 257° F. (125° C.) in a forced air oven to simultaneously dry both the charge transport layer and the ground strip.

An anti-curl coating was prepared by combining 88.2 gms of polycarbonate resin (Makrolon 5705, available from Goodyear Tire and Rubber Company) and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear dispersion to form the anti-curl coating solution. The anti-curl coating solution was then applied to the rear surface (side opposite the photogenerator layer and charge transport layer) of the electrophotographic imaging member web by extrusion coating and dried to a maximum temperature of 220° F. (104° C.) in a forced air oven to produce a dried coating layer having a thickness of 13.5 micrometers.

Example II

An imaging belt with beveled end edges is then formed employing the cutting assembly of FIGS. 7-11 and a cutting apparatus as described in FIGS. 13 and 14. Imaging material in roll form is unwound and threaded into a miter cutting apparatus described with respect to FIG. 13. The lead edge of the material overhangs a lower cutting edge at initial thread up. The miter cutter assembly 100 then traverses across the material cutting off the overhung portion of imaging material. The exact position of the lead edge of the next image sheet is now known. The lead edge is then picked up by vacuum and pulled out to the desired sheet length. Vacuum plentums under the material 300 are then turned on via a solinoid operated vacuum valve, thus sucking the material securely down. The miter cutter 100 then begins its travel across the width of the material via a rodless air cylinder, or any other suitable means. As it proceeds, roller 208 rides down on ramp 308 and comes down to the same elevation as the upper surface of the vacuum and lower shear plentum. Roller 208 then engages, and rides up the edge of the material 302. As it does so, shoe 232 also rides up onto the material, holding the imaging material down against the shear vacuum plentum. The miter knife 176 then enters into the edge of the material thereby slicing the material at the angle of the knife. The shoe 232 must be as close as possible to the shear knife so as to keep the imaging material down against the lower shear edge. The imaging material has a tendency to ride up the cutting knife, which causes a scalloped or non-parallel edge.

As the knife assembly completes its cut across the width of the material and exits the opposite edge 304, the roller 208 then hits the lead edge of ramp 320 and begins its ride up the ramp, thereby rotating support member 140 about hinge pin 154. At the top of the ramp, (shot) pin 268 is forced into an elongated slot 145 in position 144 of support member 140. Slot 145 captures the rotating portion of the miter cut assembly in the upward position. The traversing rodless air cylinder then hits its end of travel, and a proximity switch tells the logic controller to activate an air valve to send the miter cutting assembly back home. As the assembly approaches home, pin 412 enters through the elongated slot in 146, and then hits pin 268, thereby disengaging pin 268, and allowing the assembly and particularly support member 140 to rotate downward slightly until roller 208 hits ramp 308. The home proximity switch is then made, and the miter cutting sequence is now complete.

Example III

Physical and Mechanical Evaluation

Figure 5:
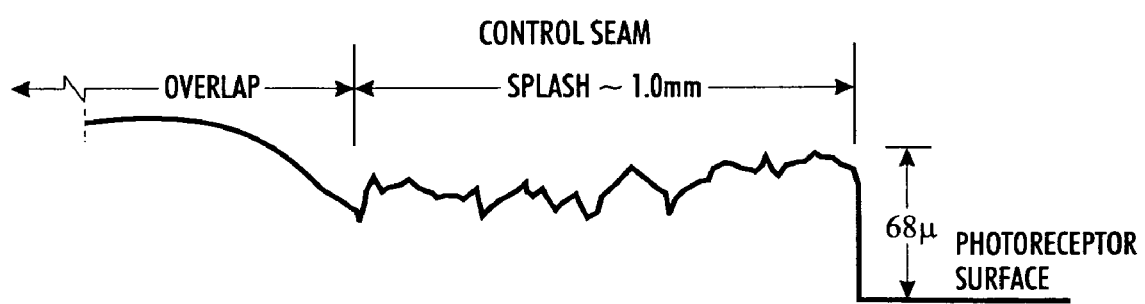
FIG. 5 illustrates the surface profile of a control seam.

A seam design (control) such as that set forth in FIG. 1 was compared to three respective disclosure seams prepared according to the processes described above. These seams were analyzed for surface topology using a surface analyzer, Surftest 402, available from Mitutoyo Company. The surface profile obtained for the control seam design set forth in FIG. 5 had a 1.0 micrometer seam splash, a splash height of 68 micrometer, and a rough surface roughness Ra value of 7.1.

Figure 6:
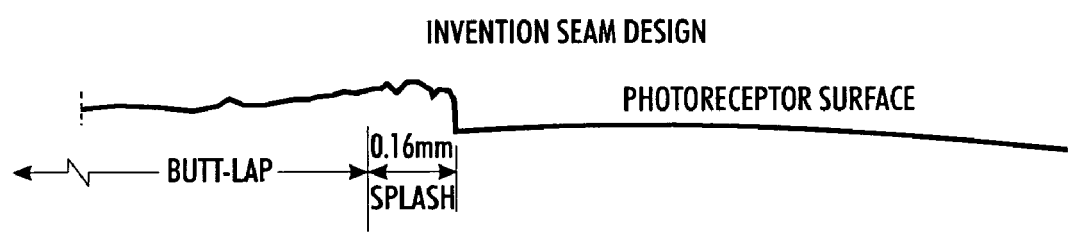
FIG. 6 shows the surface profile of a seam design disclosed herein.
Figure 7:
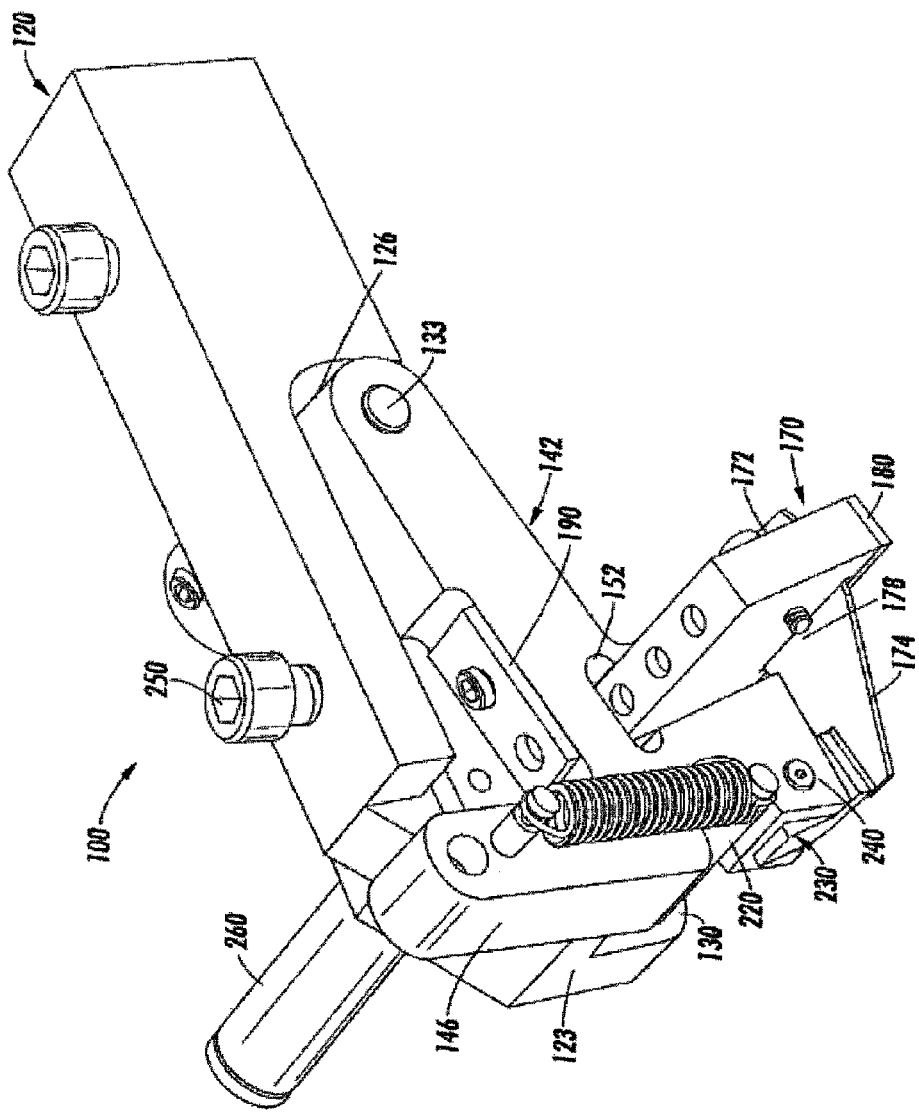
FIG. 7 depicts a perspective view of a cutting assembly for providing an angled or beveled surface in an imaging member sheet.
Figure 8:
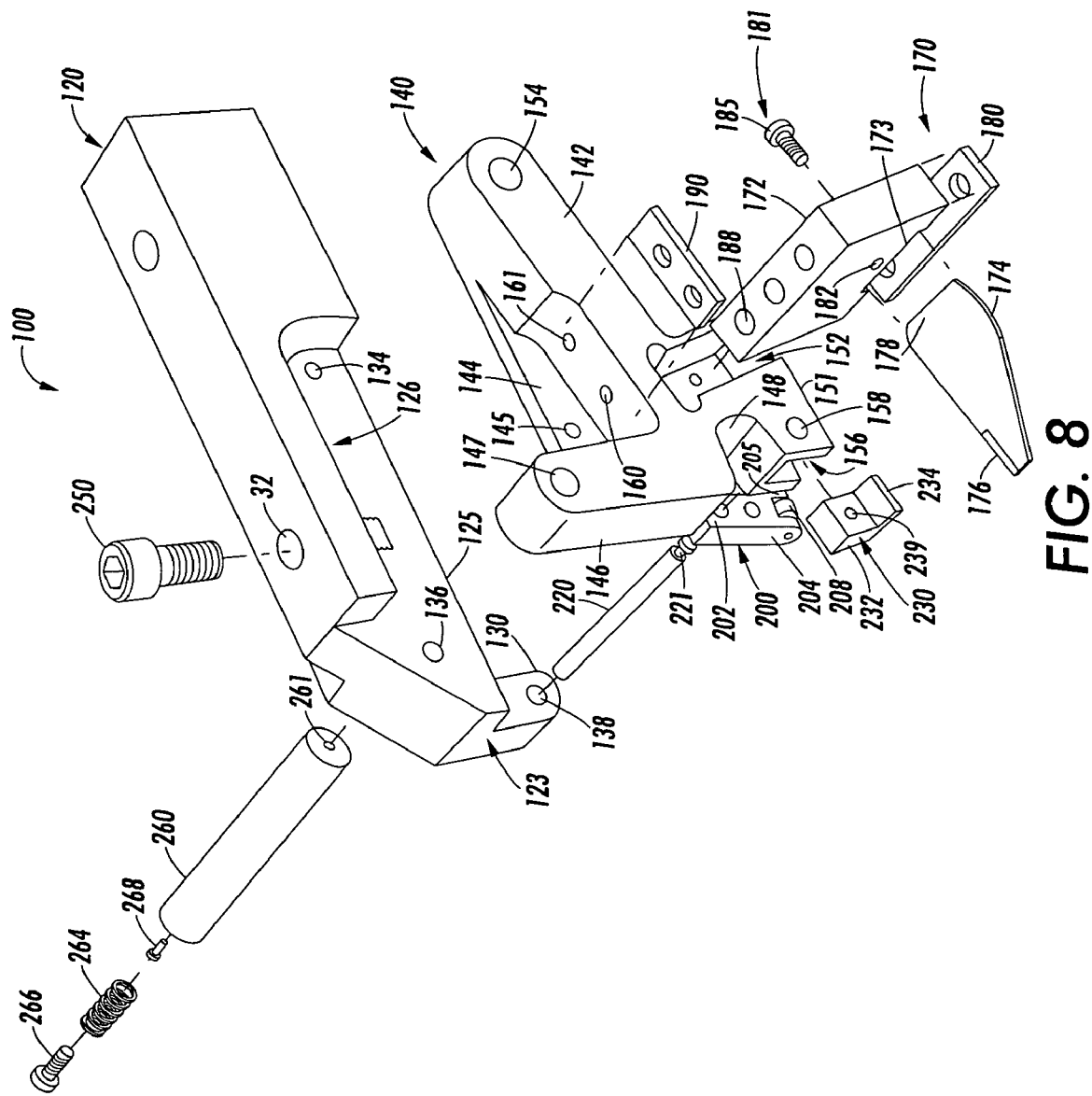
FIG. 8 is an exploded view of the cutting assembly of FIG. 7.
Figure 9:
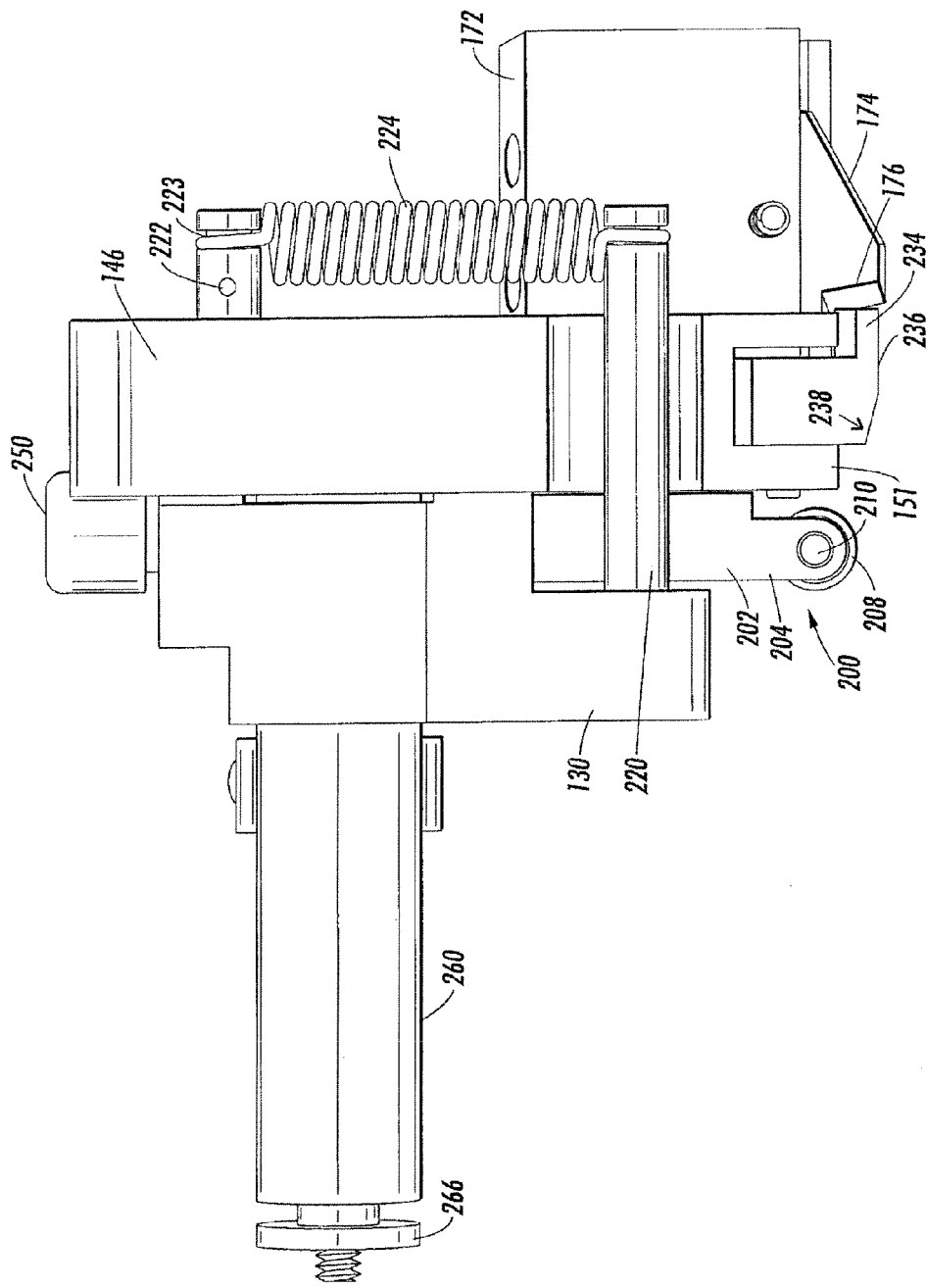
FIG. 9 is a front elevational view of the cutting assembly of FIG. 7.
Figure 10:
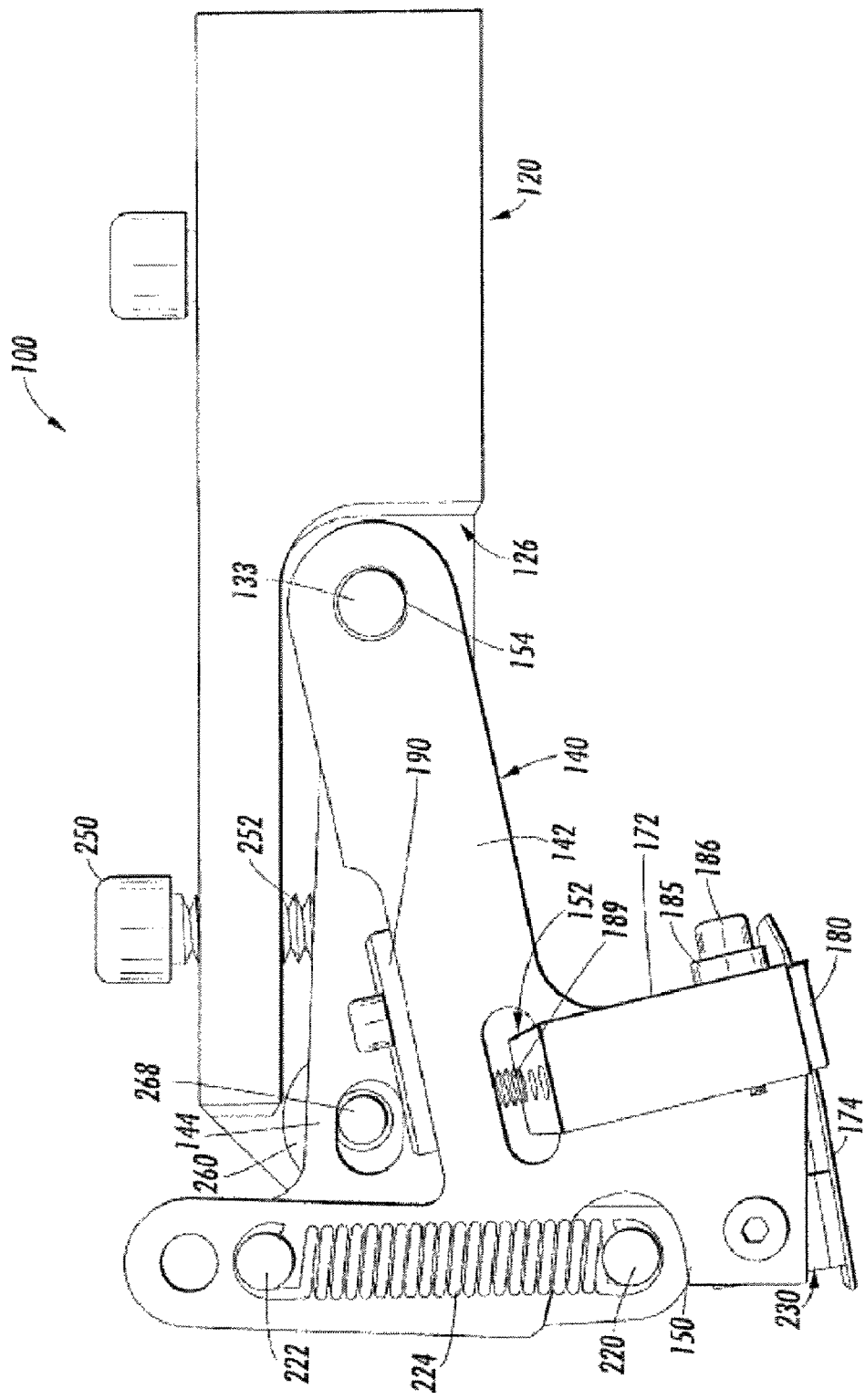
FIG. 10 is a side elevational view of the right side of the cutting assembly of FIG. 7.
Figure 11:
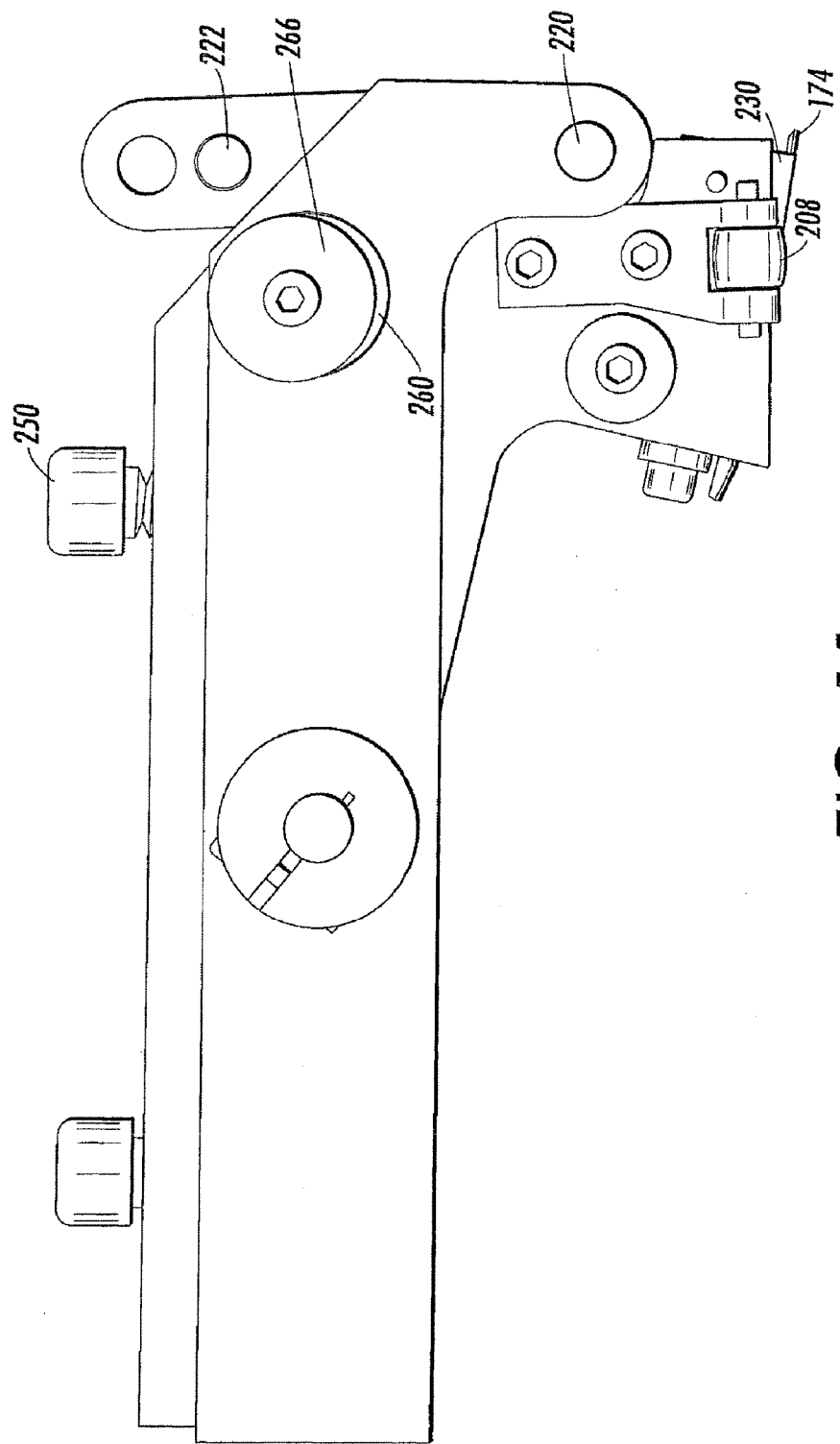
FIG. 11 is a side elevational view of the left side of the cutting assembly of FIG. 7.

In sharp contrast, the three low profile seam designs of this disclosure had a smoother seam region topology, a small 0.16 micrometer splash, a substantially reduced splash height of about 19 micrometers, and a surface roughness Ra value of 1. See FIG. 6.

In addition, seam thickness measurements, using a micrometer demonstrated that the seams of the present disclosure exhibited a significant reduction in seam region thickness. These seams exhibited thicknesses of only about 8.1 to about 8.7 percent greater than the bulk of the imaging member. By comparison, the seam counterpart of the control seam design exhibited a thickness of about 60 percent greater than the bulk imaging member.

The control seam and the three seam design of this disclosure were further evaluated for tensile seam rupture strength using an Instron Mechanical Tester. The seams of the disclosure produced a seam strength of about 8.9 and about 9.5 kgs/cm slightly lower than the 10.1 kgs/cm rupture strength obtained for their control seam counterpart. Nonetheless, these values still significantly exceeded the imaging member belt seam strength specification of 6.3 kgs/cm to assure mechanical seam integrity during dynamic imaging member belt machine function in the field.

Example IV

Dynamic Imaging Belt Cycling

The prepared electrophotographic imaging member web of Example I was again used to prepare a control seamed imaging member belt having a width of 353 mm a circumference of precisely 559.5 mm. Seamed belts having the same dimensions as the control seamed belt, but comprising a 150 slanting angle butt-lap joint according to the abrading polish technique and belt fabrication procedures described above, were also produced. Both the control and the electrophotographic imaging member seamed belts of this disclosure were each dynamically cycled tested, to the point of onset of seam failure, in a xerographic machine utilizing a belt support module comprising a 25.24 mm diameter drive roller, a 25.24 mm diameter stripper roller, and a 29.48 mm diameter tension roller to exert to each belt a tension of 1.1 pounds per inch. The belt cycling speed was set at 65 prints per minute.

The control imaging member belt, was cyclic tested to produce an equivalent of only about 56,000 print copies and terminated for the reason of notable onset of seam cracking/delamination.

The very same machine belt cycling procedures were repeated for the butt-lap seamed belt of this disclosure. Neither seam failure nor cleaning blade wear problem were observed after completion of approximately 500,000 equivalent print copies of belt cyclic testing.

Consequently, the thin profile, butt-lap seam design disclosed herein reduces seam cracking/delamination problems, provides a simple seamed belt fabrication method utilizing a conventional ultrasonic seam welding process that minimizes seam splash junction physical discontinuity, provides smoother surface topology of little or no seam splashing, effects seam region thickness reduction, produces a dimensionally stable imaging member belt, suppresses cleaning blade wear, and very importantly, produces a prepared seam substantially free of high protrusion spots to thereby reduce seamed imaging member belt rejection rates and increase imaging member belt production yield as well. Furthermore, the seam quality is improved utilizing the seam design of this disclosure such that the manual seam inspection steps may, in some instances, be eliminated.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process for producing a seamed, flexible electrostatographic imaging member belt comprising:
   a) providing a flexible, substantially rectangular, electrostatographic imaging sheet having a first major exterior surface opposite and parallel to a second major exterior surface and a first marginal end region of said sheet opposite and parallel with a second marginal end region;
   b) providing an apparatus for cutting the imaging sheet, the apparatus comprising
      i) a support member,
      ii) a blade support member connected to the support member, and
      iii) a blade assembly connected to the blade support member, the blade assembly having a cutting blade, wherein the blade support member comprises an upper surface and a lower surface, the lower surface defines a plane and the cutting blade defines a plane, and wherein the plane of the lower surface and the plane of the cutting blade join together along a line and wherein the angle between the planes is less than 90°;
   c) shaping said first marginal end region at an angle with the apparatus to form a first new sloping surface between the first major exterior surface and the second major exterior surface;
   d) shaping said second marginal end region at an angle with the apparatus to form a second new sloping surface between the first major exterior surface and the second major exterior surface, wherein the second new sloping surface is substantially parallel with the first new sloping surface;
   e) forming the sheet into a loop and overlapping said first new sloping surface with said second new sloping surface to form a mated region; and
   f) joining said first new sloping surface to said second new sloping surface in the mated region to form a seam.

2. The process according to claim 1, wherein the blade support member is pivotably connected to the support member.

3. The process according to claim 2, wherein the blade support member is downwardly biased toward an upper surface of the imaging sheet.

4. The process according to claim 3, further comprising applying a force to bias the blade support member upward and above the upper surface of the imaging sheet after the cutting blade is moved through the second major exterior surface of the imaging sheet.

5. The process according to claim 4, wherein the apparatus further comprises a means to retain the blade support member and cutting blade in an upward position above the upper surface of the imaging sheet.

6. The process according to claim 5, further comprising
   returning the apparatus to a position adjacent the first major exterior surface of the cutting sheet;
   positioning the image sheet to provide a new location to be cut;
   releasing the retainer means on the apparatus such that the blade support arm and cutting blade are downwardly biased adjacent the surface of the imaging sheet;
   performing another cutting operation to provide a second sloping surface across the imaging sheet.

7. The process of claim 1, wherein the apparatus further comprises a first pin connected to a pivot arm on the blade support member, a second pin connected to the support member and generally parallel to the first pin, and a means attached to the first and second pins for biasing the pivot arm downward toward a surface of an associated imaging sheet to be cut.

8. A process for producing a seamed, flexible electrostatographic imaging member belt comprising:
   a) providing a flexible, substantially rectangular, electrostatographic imaging sheet having a first major exterior surface opposite and parallel to a second major exterior surface and a first marginal end region of said sheet opposite and parallel with a second marginal end region;
   b) providing an apparatus for cutting the imaging sheet, the apparatus comprising
      (i) a support body, and
      (ii) a blade support member pivotably connected to the support body and biased away from the support body, the blade support member comprising a lower surface, a guide member positioned in a slot in the lower surface, and a cutting blade;
      wherein the cutting blade comprises a flat surface and an angled straight blade edge, the blade edge facing towards the guide member;
      wherein the lower surface defines a plane and the flat surface of the cutting blade defines a plane, the plane of the lower surface and the plane of the flat surface of the cutting blade join together along a line, and the angle between the two planes is less than 90°; and
      wherein the guide member includes a generally planar lower surface extending below the slot and adapted to ride generally parallel to a surface of the associated substrate;
   c) shaping said first marginal end region at an angle to form a first new sloping surface between the first major exterior surface and the second major exterior surface;
   d) shaping said second marginal end region at an angle to form a second new sloping surface between the first major exterior surface and the second major exterior surface, wherein the second new sloping surface is substantially parallel with the first new sloping surface;
   e) forming the sheet into a loop and overlapping said first new sloping surface with said second new sloping surface to form a mated region; and
   f) joining said first new sloping surface to said second new sloping surface in the mated region to form the belt, wherein the first and second new sloping surfaces form a continuous seam from a first side of the belt to a second side of the belt, wherein the first and second sloping surfaces have an angle substantially equal to each other, the angle of the first and second sloping surfaces being less than 90°.

9. The process according to claim 8, wherein the angle between the two planes is about 45° or less.

10. The process according to claim 8, wherein the angle between the two planes is about 30° or less.

11. The process according to claim 8, wherein the angle between the two planes is from about 5° to about 15°.

12. A method for producing a seamed, flexible electrostatographic imaging member belt comprising:

providing a flexible, substantially rectangular, electrostatographic imaging sheet having a top surface, a bottom surface, a first major exterior surface opposite and parallel to a second major exterior surface and a first marginal end region of said sheet opposite and parallel with a second marginal end region;

providing a cutting apparatus comprising
i) a support member having an upper surface, a lower surface, a first vertical surface, a second vertical surface, a proximate end, and a distal end,
ii) a blade support member pivotably connected to the support member, the blade support member comprising a pivot arm having a proximate end, a distal end, an upper portion adjacent the proximal end, and a lower portion adjacent the proximate end of the blade support member; and
iii) a blade mount assembly connected to the blade support member, the blade mount assembly comprising a cutting blade having a blade edge wherein the cutting blade is oriented at an angle of about 45° or less relative to the top and bottom surfaces of the imaging sheet, wherein the blade support member comprises an upper surface and a lower surface, the lower surface defines a plane and the cutting blade defines a plane, and wherein the plane of the lower surface and the plane of the cutting blade join together along a line and wherein the angle between the planes is less than 90°;

shaping said first marginal end region at an angle with the apparatus to form a first new angled surface between the first major exterior surface and the second major exterior surface;

shaping said second marginal end region at an angle with the apparatus to form a second new angled surface between the first major exterior surface and the second major exterior surface, wherein the second new angled surface is substantially parallel with the first new angled surface;

forming the sheet into a loop and overlapping said first new angled surface with said second new angled surface to form a mated region; and joining said first new angled surface to said second new angled surface in the mated region to form a seam.

13. The method according to claim 12, wherein each of the first and second angled surfaces has an angle of about 15° or less.

14. The method according to claim 12, wherein each of the first and second angled surfaces has an angle of from about 5° to about 15°.

15. The method according to claim 12, wherein the cutting apparatus further includes a guide member comprising a i) proximate end adjacent the blade edge of the cutting blade, ii) a distal end, and iii) a lower surface, a portion of the lower surface adjacent the proximate end of the guide member having a generally planar surface defining a first plane generally parallel to the upper surface of the imaging sheet, and a portion of the lower surface adjacent the distal end of the guide member being angled upward out of the first plane of the lower surface of the guide member.

16. The method according to claim 12, wherein the cutting apparatus further comprises a first pin connected to the pivot arm, a second pin connected to the support member and generally parallel to the first pin, and a means attached to the first and second pins for biasing the pivot arm downward toward a surface of an associated imaging sheet to be cut.

17. The method according to claim 16, wherein the means for biasing the pivot arm downward is a spring.

18. The method according to claim 12, further comprising
applying a force to bias the blade support member upward and above the upper surface of the imaging sheet after the cutting blade is moved through the second major exterior surface of the imaging sheet;
retaining the blade support member and cutting blade in an upward position above the upper surface of the imaging sheet using a retainer means;
returning the apparatus to a position adjacent the first major exterior surface of the cutting sheet;
positioning the image sheet to provide a new location to be cut;
releasing the retainer means on the apparatus such that the blade support arm and cutting blade are downwardly biased adjacent the surface of the imaging sheet; and
performing another cutting operation to provide the second angled surface.

* * * * *